US012522325B2

(12) United States Patent
Sabow

(10) Patent No.: US 12,522,325 B2
(45) Date of Patent: Jan. 13, 2026

(54) ATTACHMENTS FOR A COLLAPSIBLE MARINE LADDER

(71) Applicant: Robin Sabow, North Miami Beach, FL (US)

(72) Inventor: Robin Sabow, North Miami Beach, FL (US)

( * ) Notice: Subject to any disclaimer, the term of this patent is extended or adjusted under 35 U.S.C. 154(b) by 1052 days.

(21) Appl. No.: 17/532,515

(22) Filed: Nov. 22, 2021

(65) Prior Publication Data

US 2022/0089254 A1 Mar. 24, 2022

Related U.S. Application Data

(63) Continuation-in-part of application No. 16/056,117, filed on Aug. 6, 2018, now Pat. No. 11,180,222.

(51) Int. Cl.
*B63B 27/14* (2006.01)
*E06C 7/16* (2006.01)

(52) U.S. Cl.
CPC ............ *B63B 27/146* (2013.01); *E06C 7/165* (2013.01)

(58) Field of Classification Search
CPC .......... E06C 7/165; E06C 7/182; E06C 7/183; B63B 27/146; E04H 4/144
See application file for complete search history.

(56) References Cited

U.S. PATENT DOCUMENTS 2,896,831 A 7/1959 Ellingson
2,992,697 A * 7/1961 Klages ...................... E06C 1/34 182/216
3,061,042 A 10/1962 Giles
3,305,045 A 2/1967 Raymond
3,487,889 A * 1/1970 Carlin ...................... E06C 7/08 182/228.2
3,621,936 A 11/1971 Andreassen
3,907,067 A * 9/1975 Kennedy .................. E06C 9/14 182/164
3,944,024 A 3/1976 Adas
4,153,137 A 5/1979 Johnson
4,724,925 A 2/1988 Ritten
(Continued)

FOREIGN PATENT DOCUMENTS

DE 202019001698 U1 6/2019
DE 202019004166 U1 4/2020
(Continued)

*Primary Examiner* — Colleen M Chavchavadze
(74) *Attorney, Agent, or Firm* — Derek Fahey, Esq.; The Plus IP Firm, PLLC

(57) ABSTRACT

A collapsible marine ladder has a stowed configuration and a deployed configuration. The collapsible marine ladder has a first rail, a second rail, and rungs. Each rung has a rung length spanning between the first rail and the second rail. A rung attachment is attached to each of the plurality of rungs, wherein the rung attachment comprises a rung attachment body, a recess along a bottom section of the rung attachment body for receiving the rung, and a top surface of the rung attachment body. A first section of the top surface is above the rung when the rung attachment is attached to the rung and the collapsible marine ladder is in the deployed configuration. A second section is cojoined with a front side of the first section and wherein the second section is downwardly angled such that an angle is formed between the first section and the second section.

15 Claims, 28 Drawing Sheets

(56) References Cited

U.S. PATENT DOCUMENTS

| | | | | | |
|---|---|---|---|---|---|
| 4,804,063 | A * | 2/1989 | Farris | E06C 7/16 | 182/228.2 |
| 4,998,982 | A | 3/1991 | Arnold et al. | | |
| D320,592 | S | 10/1991 | Straka | | |
| 5,056,620 | A | 10/1991 | Zumwalt et al. | | |
| 5,111,908 | A | 5/1992 | Reiter et al. | | |
| 5,282,339 | A * | 2/1994 | Devlin | E02D 29/122 | 52/186 |
| 5,692,581 | A | 12/1997 | Nelson et al. | | |
| 5,779,208 | A | 7/1998 | Mcgraw | | |
| 5,931,257 | A | 8/1999 | Harden | | |
| 5,931,258 | A | 8/1999 | Lorentz | | |
| 5,975,240 | A | 11/1999 | O'Brien | | |
| 6,237,523 | B1 | 5/2001 | Day et al. | | |
| 6,415,890 | B1 | 7/2002 | Tucker et al. | | |
| 6,422,340 | B1 | 7/2002 | Grundler | | |
| 6,554,446 | B1 | 4/2003 | Walsh et al. | | |
| 6,619,428 | B2 * | 9/2003 | Ellis | E06C 7/081 | 182/127 |
| 6,640,929 | B2 * | 11/2003 | Korpi | E06C 5/02 | 182/127 |
| 6,729,438 | B1 | 5/2004 | Perrett | | |
| 6,994,185 | B1 | 2/2006 | Hertel | | |
| 7,992,681 | B2 * | 8/2011 | Anderson | E06C 7/182 | 182/106 |
| 8,727,074 | B1 | 5/2014 | Bhajan | | |
| D728,128 | S | 4/2015 | Haney | | |
| 9,067,647 | B2 * | 6/2015 | Neese | B63B 27/14 | |
| 9,540,875 | B2 * | 1/2017 | Ellis | E06C 7/182 | |
| 9,611,692 | B1 | 4/2017 | Rogers | | |
| 9,677,336 | B2 | 6/2017 | Najey | | |
| 9,708,039 | B2 | 7/2017 | Neese | | |
| 10,006,248 | B2 | 6/2018 | Goodnow et al. | | |
| D826,429 | S | 8/2018 | Champ et al. | | |
| 10,189,548 | B1 | 1/2019 | Moore | | |
| 10,352,098 | B2 | 7/2019 | Frensley | | |
| 2004/0074698 | A1 | 4/2004 | Lawrence | | |
| 2006/0272895 | A1 * | 12/2006 | Lavoie | B60R 3/02 | 182/127 |
| 2009/0199758 | A1 | 8/2009 | Garelick | | |
| 2010/0031573 | A1 | 2/2010 | Whiting et al. | | |
| 2010/0200331 | A1 | 8/2010 | Hager | | |
| 2011/0232201 | A1 | 9/2011 | Cardwell | | |
| 2011/0297482 | A1 | 12/2011 | O'Brien et al. | | |
| 2014/0326538 | A1 | 11/2014 | Najey | | |
| 2017/0167198 | A1 | 6/2017 | Goodnow et al. | | |
| 2018/0044985 | A1 * | 2/2018 | Orscheln | B60R 3/02 | |
| 2018/0327002 | A1 * | 11/2018 | Nasrabad | B61D 23/00 | |

FOREIGN PATENT DOCUMENTS

| | | | | |
|---|---|---|---|---|
| EP | 0940556 | A2 * | 9/1999 | E06C 7/182 |
| FR | 3007449 | A1 * | 12/2014 | E06C 1/397 |
| GB | 2362181 | A | 11/2001 | |
| WO | WO-2017031523 | A1 * | 3/2017 | E06C 1/12 |

* cited by examiner

ATTACHMENTS FOR A COLLAPSIBLE MARINE LADDER

CROSS-REFERENCE TO RELATED APPLICATIONS

This application is a continuation in part application claiming the benefit of U.S. Non-Provisional patent application Ser. No. 16/056,117, filed on Aug. 6, 2018, and entitled "ATTACHMENTS FOR A COLLAPSIBLE MARINE LADDER", the subject matter of which is incorporated herein in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of the maritime industry and more particularly to the field of collapsible marine ladders.

BACKGROUND

The recreational boating industry is a multibillion-dollar industry. According to the National Marine Manufactures Association. In the US alone, in 2016 the annual sales of boats, marine products and services was 36 billion US dollars and over 141.6 million Americans went boating. Most recreational boaters enjoy the water and spending time near the water. Many of those boaters will swim in the water surrounding the boat at some point while on the water.

Many recreational boaters will use ladders to climb out of the water and back into the boat. Of those ladders may recreational boats will come equipped with collapsible ladders so that people on the boat may climb out the ladder and back into the boat. Many collapsible ladders have telescoping rails that are hingedly attached to a platform at the stern or rear of the boat. However, many ladders are in locations other than the stern. The upper ends of the rails of the ladders are hingedly attached to the platform so that the upper ends of the rails of the ladders are proximate to the edge of the upward facing surface of the platform. With the upper ends of the rails in connection with the platform, the rails extend downwards such that the rungs or steps of the rail extend below the platform and into the water so that a user may climb out of the water and into the boat. However, the collapsible ladders have many problems.

One problem with collapsible ladders is that it does not provide enough leverage or a means for users to easily climb the ladder. As a user ascends the ladder, it becomes difficult to continue ascending the ladder because there is no device designed for a user to grasp above the platform. This makes it very difficult to ascend the ladder, especially in rough or wavy conditions, for people with physical or mental impairments or overweight people. The reason there is device above the platform and the hinging means, is that the ladder must be collapsible and a device above the platform or the hinging means would not allow the ladder to fold or collapse.

Another problem with collapsible ladders is that the rungs of the collapsible ladders may cause discomfort to users when the ladder is being used. The rungs of collapsible ladders are manufactured to be at a minimal width. More specifically, the width of the rungs is significantly less than the length of a person's foot. Additionally, typically the upward facing surface of the rungs are flat and perpendicular to the ladder rails. When a person ascends the ladder and out of the water, the person must position the user's feet on the rungs. As a person ascends out of the water, the amount of pressure or forces acting on a portion of a person's foot can cause pain or discomfort to the user due to the configuration of the collapsible rung.

As a result, there exists a need for improvements over the prior art and more particularly for a better way to ascend out of the water and onto a boat when recreational boating.

SUMMARY

Attachments for a collapsible marine ladder is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, attachments for a collapsible marine ladder are disclosed. A collapsible marine ladder comprises a stowed configuration and a deployed configuration. The collapsible marine ladder comprises a first rail and a second rail, and a plurality of rungs, wherein each rung of the plurality of rungs has a rung length spanning between the first rail and the second rail. The collapsible marine ladder also includes a plurality of first rail segments telescopically arranged defining the first rail so that the first rail can move between a first rail stowed configuration and a first rail deployed configuration. A plurality of second rail segments telescopically is arranged defining the second rail so that the second rail can move between a second rail stowed configuration and a second rail deployed configuration. A rung attachment is attached to each of the plurality of rungs, wherein the rung attachment comprises a rung attachment body spanning a substantial portion of the rung length, a recess along a bottom section of the rung attachment body for receiving the rung, and a top surface of the rung attachment body. A first section of the top surface is above the rung when the rung attachment is attached to the rung and the collapsible marine ladder is in the deployed configuration. A second section is cojoined with a front side of the first section, wherein the second section is downwardly angled such that an angle of at least seven degrees and at most thirty degrees is formed between the first section and the second section. A third section is cojoined with a back side of the first section, wherein the third section is downwardly angled such that an angle of at least seven degrees and at most thirty degrees is formed between the first section and the second section.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
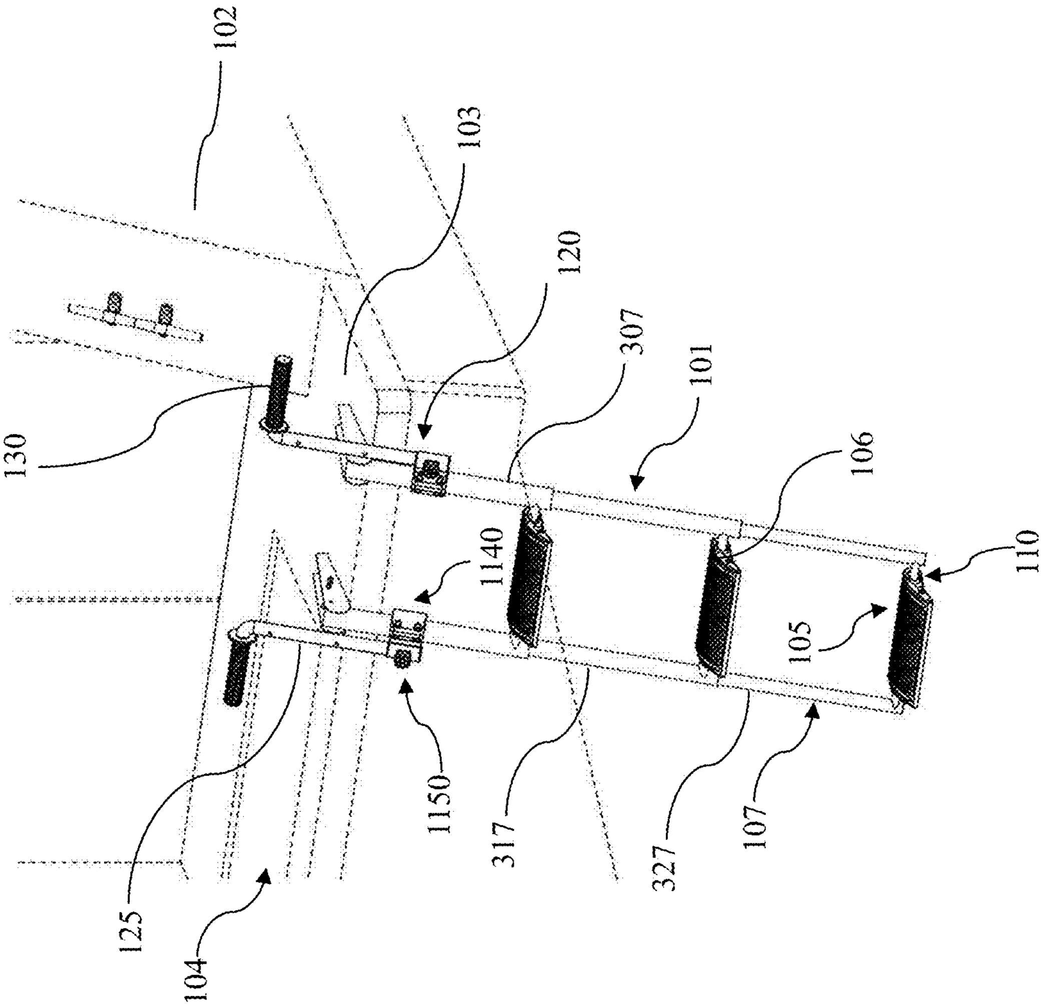
FIG. 1 is a perspective view of attachments for a collapsible marine ladder, wherein the ladder is in the fully extended configuration, wherein a rung attachment of the attachment is attached to each rung and a rail extension and handgrip are in the extended configuration, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing attachments for a collapsible ladder that makes it much easier to ascend out of the water and onto the boat. The attachments may be provided as a kit for attaching to the marine ladder. The kit be included together in a single package or provided as separate packages. The attachments may also be provided as single units. A rail attachment for attaching to the rails of the collapsible ladder allows a rail extension having a handgrip that, in the extended configuration, is configured to be positioned above an upper end of the rail and above a dive platform. The rail extension and handgrip provide a device for a person to hold onto that makes it easier for a person to ascend the ladder and out of the boat because the user can more efficiently use his or her feet and hands when ascending onto the dive platform. The handgrips in the extended configuration are also configured to be perpendicular to the ladder rails and outside of the ladder rails so that the handgrips more easily prevent a person from swaying on the ladder.

The disclosed embodiments also improve over the problems with the prior art by providing a rung attachment that decreases the amount of pressure on a user's foot while the user initially begins ascending the ladder and ascends the ladder. The rung attachment has a downwardly angled section and a width that significantly decreases the amount of force acting on a portion of a user's foot thereby making it less painful to ascend the ladder. Additionally, the combination of the handle grips positioned above the platform and the downwardly angled section of the rung section decreases the amount of forces required by the user to excerpt on a single muscle group and makes it easier for a user to climb the ladder.

The disclosed embodiments also improve over the prior art by providing a pad positioned on the upward facing side of the rung attachment that greatly increases the comfort to the user when the use ascends the ladder. Additionally, the present invention also improves over the prior art by providing a light emitting apparatus that emits light proximate to the rungs so that a person may easily see the rungs in the water. The present invention may also include a pad having properties such that ornamental features, branding and other designs may be used.

Figure 2:
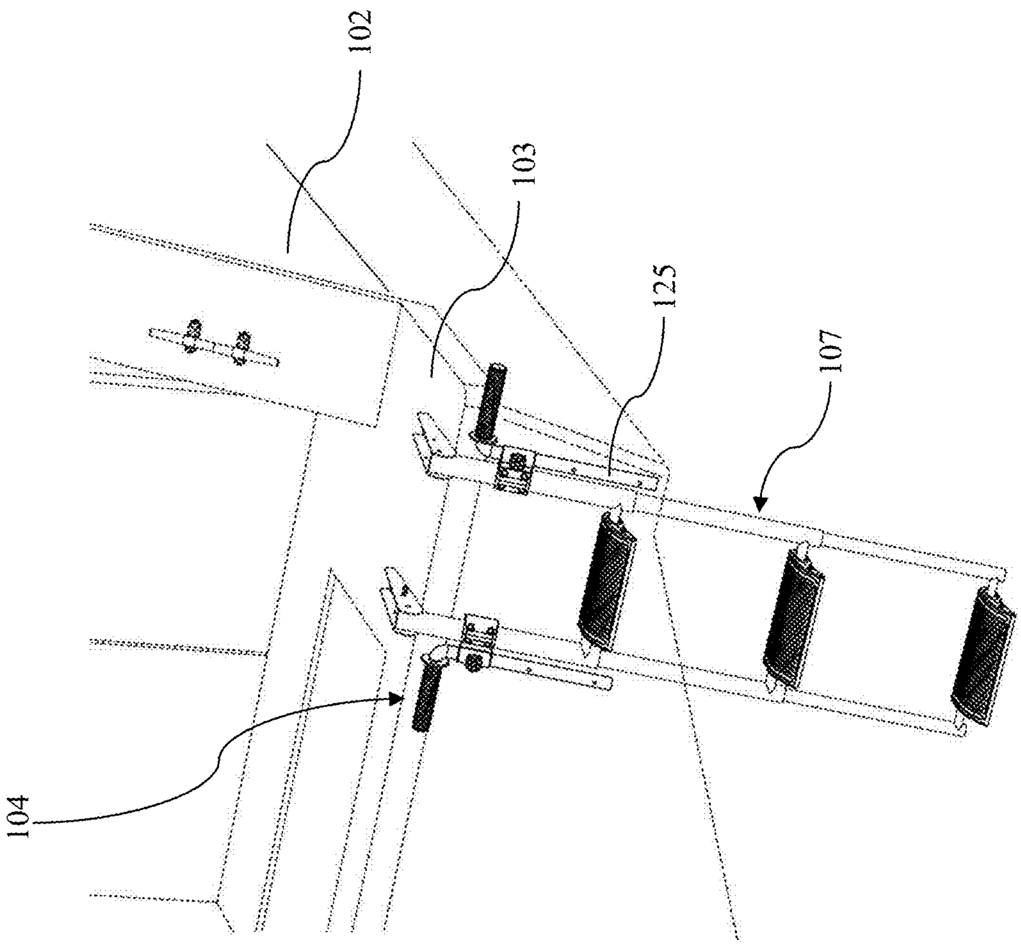
FIG. 2 is a perspective view of the attachments for a collapsible marine ladder, wherein the ladder is in the fully extended configuration and the rail extension is in a storage configuration and the handgrip is in the extended configuration, according to an example embodiment.
Figure 3:
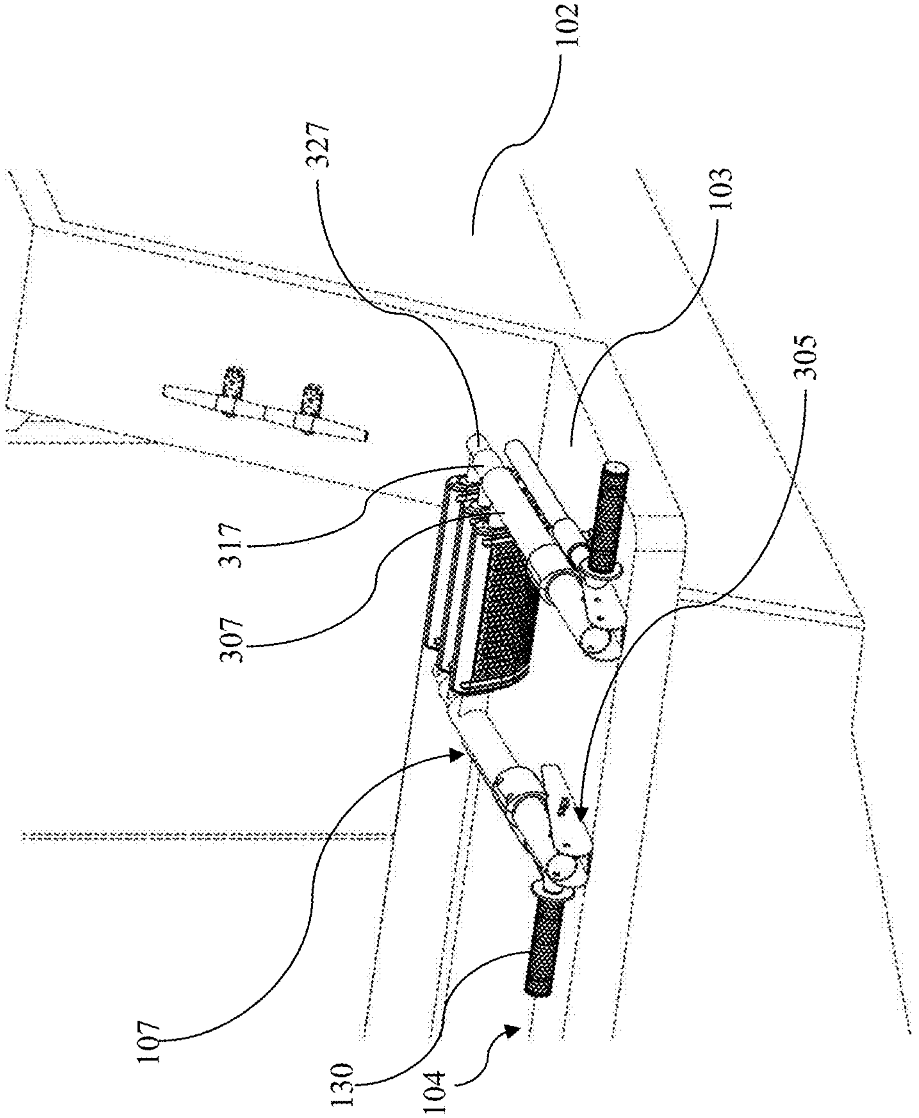
FIG. 3 is a perspective view of the attachments for a collapsible marine ladder, wherein the ladder is in the fully collapsed configuration and the rail extension is in a storage configuration and the handgrip is in the extended configuration, according to an example embodiment.

Referring now to the Figures, FIGS. 1-3 will be discussed together. FIG. 1 is a perspective view of attachments 105 for a collapsible marine ladder 101. In FIG. 1-3 the collapsible marine ladder is attached to the stern of a recreational boat 102. However, it is understood that ladders may be attached to other portions or locations of a boat. The ladders may be used for boats for non-recreational uses. FIGS. 1 and 2 illustrate the ladder in a fully extended configuration. It is understood that throughout this application the term "upward facing" will mean facing upwards when the collapsible ladder is arranged in a fully extended configuration (as illustrated in FIG. 1) such that the rungs of the ladder are positioned below the dive platform and the term "downward facing" will mean facing downwards when the collapsible ladder is arranged in a fully extended configuration such that the rungs of the ladder are positioned below the dive platform.

The ladder as a ladder that is used for many types of boats, including recreational and non-recreational boats. The ladder includes a pair of parallel telescoping rails 107 and a series of rungs 106 that span between the parallel telescoping rails. For example, the ladder may include a first rail member 327 configured to be received within a second rail member 317, which will be received by the third a member 307. The rail members may be a tubular shaped body. The top end of the first rail member 327 may have a flanged portion (not shown) that is configured to provide a stop against an inwardly protruding portion (not shown) of the bottom end of the second rail member 317 when the ladder is in a fully extended configuration. Similarly, the top end of the second rail member 317 may have an outwardly protruding member (not shown) that is configured to act they stop against an outwardly protruding member (not shown) at the bottom end of the third rail member 307 when the ladder is in a fully extended configuration. An opening at the bottom end of the second rail member provides access into a channel (not shown) within the body of the second rail member and allows the first rail member to be received within the channel (not shown) of the second rail member (as illustrated in FIG. 3). Similarly, an opening (not shown) at the bottom end of the third rail member provides access into a channel (not shown) within the body of the third rail member and allows the second rail member to be received within the channel of the second rail member so that ladder be in a fully collapsed configuration as illustrated in FIG. 3.

The ladder is configured to assist a person to exit the water and onto a dive platform 103 of a boat when in the fully extended configuration as illustrated in FIGS. 1 and 2, for example. In the fully extended configuration, as mentioned above, the inwardly protruding portion (not shown) at the bottom end of the third rail segment abuts outwardly protruding portion (not shown) of the second rail segment and the inwardly protruding portion (not shown) at the bottom end of the second rail segment abuts the inwardly protruding portion (not shown) of the first rail segment.

The upper ends of each of the rails is configured to be hingedly attached using a hinging mechanism to the upward facing surface 104 of platform or dive platform. In the present embodiments, the hinging or pivoting apparatus comprises a pair of parallel wall sections 370 having a channel 365 configured for allowing the rail segment to be attached hingedly by a pin 375 between the parallel wall sections so that the rails may pivot or hinge relative to the parallel wall sections. The hinging mechanism may also include a removable lockpin that is configured to lock the rail segments in the storage configuration (as illustrated in FIG. 3. FIG. 3 illustrates the ladder in the fully stored or storage configuration. In the fully stored or storage configuration, the first rail member is received within the second rail member and the second rail member is received within the third rail member such that each of the rungs 106 or proximate to the each other. Additionally, in the storage configuration the rail segments are positioned such that the rail segments are substantially parallel and proximate to the upward facing surface of the dive platform. The storage configuration is so that the ladder may be stored when the ladder is not in use. Additionally, straps or tiedowns may be used to further secure the ladder in the fully collapsed or storage configuration.

Figure 11:
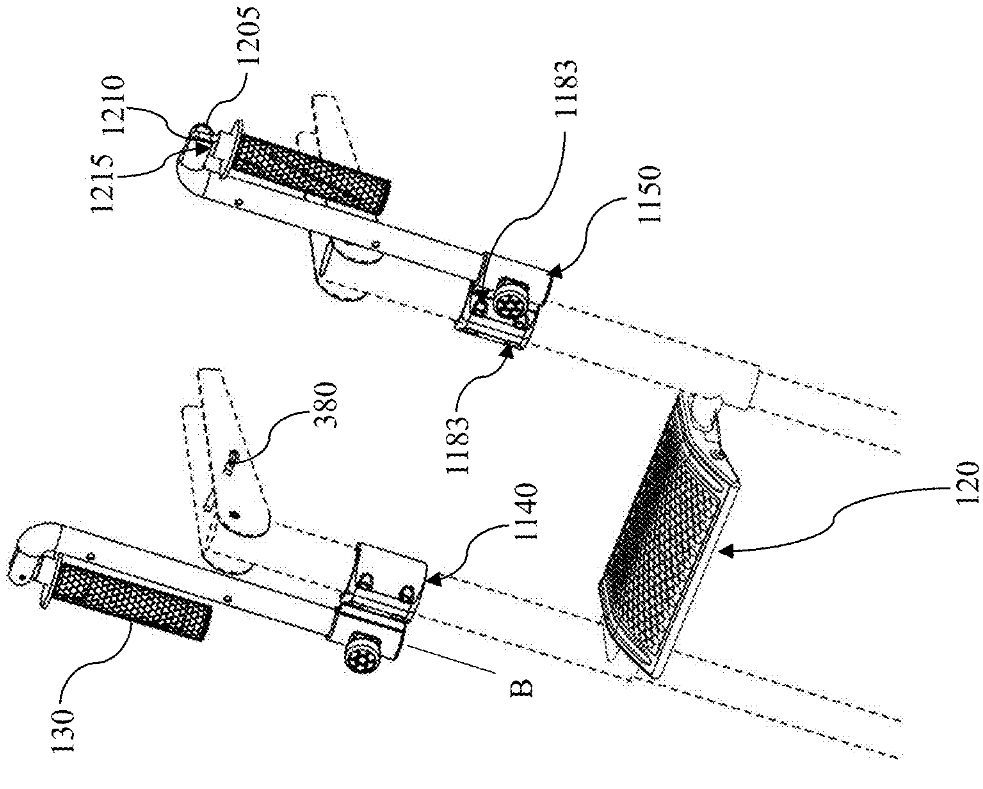
FIG. 11 is a perspective view of the rail extension in the extended configuration and the handgrip in a storage configuration, according to an example embodiment.

FIGS. 1-3 also illustrate the attachments or device 105 that attaches to the ladder. The attachments or device may include at least one rung attachment 110, which is further explained below. As mentioned above the attachments may be included as a single kit for the collapsible ladder. The device, attachments or kit may also include at least one rail attachment 120, which is further explained below. Certain components of the rung attachment and the rail attachment may be made from noncorroding materials like stainless steel, aluminum, fiberglass, and plastic. However other types of materials are within the spirit and scope of the present invention. In one embodiment, the device, attachments or kit may include either the rail attachment or the rung attachment. In other embodiments, the device, attachment or kits may include both the rail attachment and rung attachment. In other embodiments, the device, attachments or kits may include a rung attachment for each rung and a rail attachment for each rail. In FIGS. 1-3 of the rung attachment is attached to each rung of the ladder. In FIGS. 1 and 2 the rail attachment is in the fully extended configuration, which is further explained below. In the present embodiment, the ladder has a rail attachment in attachment with each of the third segments 307 of the rails. However, it is understood that in other embodiments only one rail attachment may be used. Each of the rail attachments includes a rail receiving element 1140 that mounts the rail attachment to the rail. Additionally, each of the rail attachments also includes an extension receiving element 1150 that receives a rail extension 125 of the rail attachment. A handgrip 130 at an upper end of the rail extension of the rail attachment allows a person to grip the rail attachment easily when ascending the ladder. In FIGS. 1 and 2 the handgrip is in a fully extended configuration. In certain embodiments, the handgrip may also be configured to move into a fully collapsed configuration or storage configuration as illustrated in FIG. 11 and further explained below.

Figure 9:
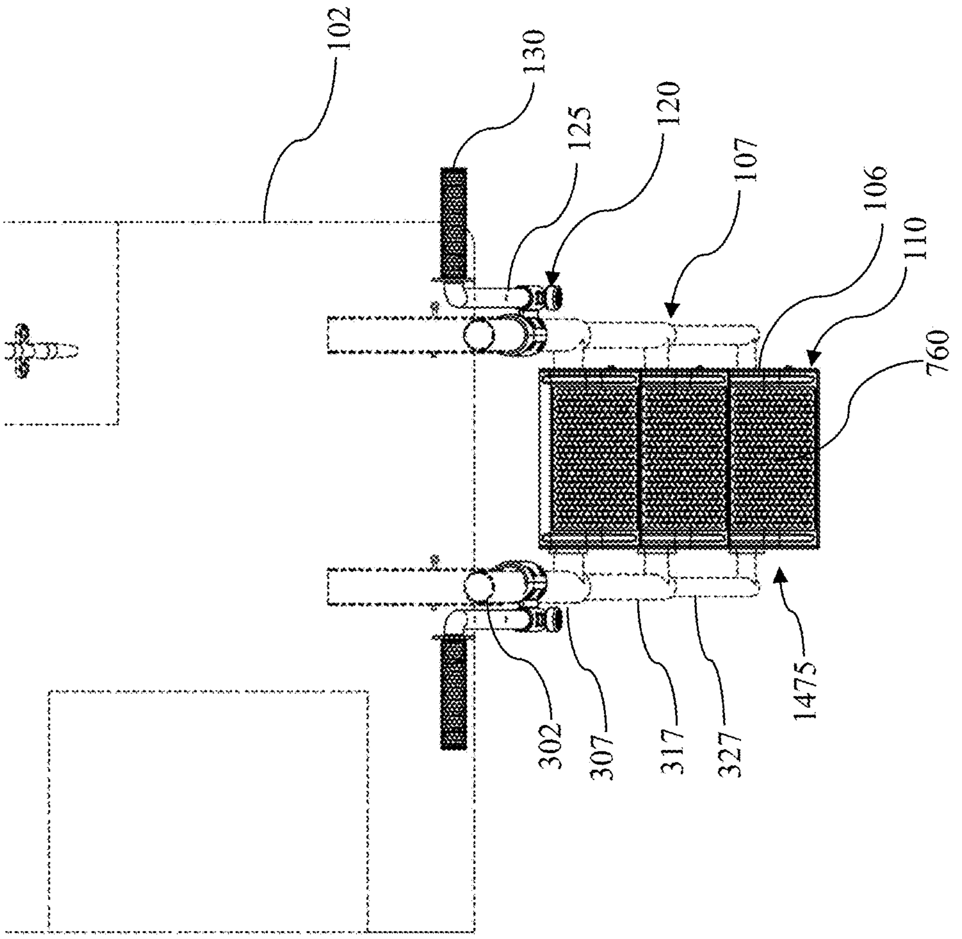
FIG. 9 is a top view of the attachments for a collapsible marine ladder, wherein the ladder is in the fully extended configuration and the rail extension and handgrip are in the extended configuration, according to an example embodiment.

FIGS. 7, 9, 10A and 10B will be discussed together. The attachments, device or kit may also include at least one rung attachment 110. Each rung attachment is configured for attaching to the rung of the ladder. In the present embodiments, for example in FIG. 1, a rung attachment is attached to each of the rungs of the ladder. However, in other embodiments other amount of rung attachments may be less than the total amount of rungs used and is within the spirit and scope of the present invention. Each rung attachment may include an upper part 705 and a downward facing part or lower part 710. The upper part of the rung attachment has an upward facing side 707 and an opposing the downward facing side 717. In the present embodiments, the upper part has a shape having a substantially rectangular shaped profile when viewed from above, as illustrated in FIG. 9). However, it is understood that other shapes profiles may also be used and are within the spirit and scope of the present invention. A first channel 727 is defined along the downward facing side of the lower part of the rung attachment. The first channel 727 is configured to receive the upward facing side 728 of the rung. In the present embodiments, the first channel 727 is a substantially semicircular shaped channel defined by the wall sections of the downward facing side of upper part of the rung attachment.

The upper part also includes a downwardly angled section 750 defined by the body of the upper part. The downwardly angled section is configured such that a first end 751 of the downwardly angled section extends below the rung when the upper part is attached to the rung. The downwardly angled section is a generally triangular shaped body that is frontward of the first channel 727 of the upper part. The downwardly angled section has two purposes. The first purpose is to house components that may be useful such as lighting components or apparatus, circuitry, power sources, pads, and other elements with ornamental features. The second purpose is for providing a more efficient way, comfortable and easy way to ascend the ladder when the ladder is positioned in the water.

A first cutout 1020 on the upward facing side of the upper part is configured for receiving a pad 760. The first cutout defines a retention lip 1460 on the upward facing side of the upper part of the rung attachment and a removable retention plate 1050 is configured for maintaining the pad on the upward facing surface of the upper part of rung attachment when the rung attachment is in the fully assembled configuration.

Figure 12:
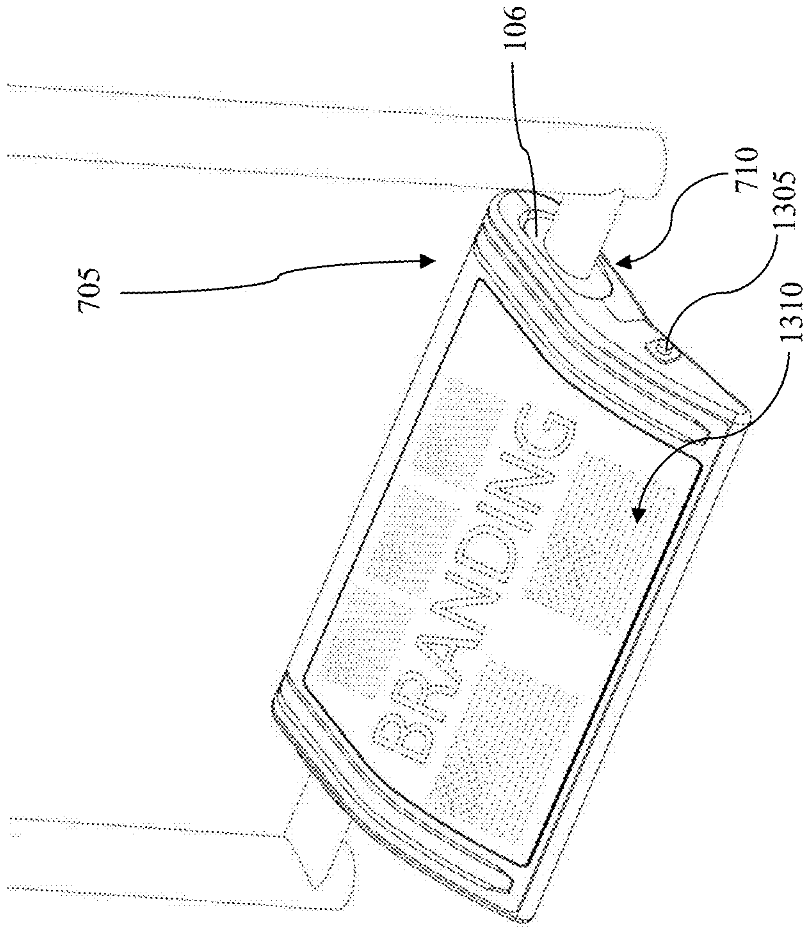
FIG. 12 is a perspective view of the rung attachment displaying ornamental features and designs on the upward facing surface of the rung attachment, according to an example embodiment.

The pad 760 may be made of materials that provides a comfortable surface on which a user's foot to position his or her foot. The pad may also have flexible properties so that it may be manipulated into position. The materials for the pad may include rubber, polymeric materials such as foam, silicone, plastic, polyvinyl chloride (PVC) plastic, vinyl, silicone etc. or any combination thereof. In one embodiment, the pad may be made of material having transparent or translucent properties so that light emitted from light emitting device 1040 may shine through the pad. In other embodiments the light the pad may be configured to display ornamental designs 1470 (as illustrated in FIG. 12). In one embodiment, the ornamental designs printed, embossed or otherwise disposed on the outward facing surface of the pad. In other embodiments where the pad has transparent or translucent properties the ornamental design may be disposed on the downward facing side of the pad or may printed on material positioned within the pad. However, other means of having a pad for displaying ornamental features of designs to be viewed above the upward facing surface of the pad be used and is within the spirit and scope of the present invention.

In the present embodiment, the pad is a substantially rectangular planar shaped body. The outward facing side of the pad may also include a gripping surface or grips so that user's foot may have traction when stepping on the rung attachment. In one embodiment, the gripping surface may include a plurality of ridges 761 and depressions 762 along the outward facing surface of the pad. The ends of the pad may have a protruding element 763 at the perimeter of the pad that is configured to be wedged below the lip 1460 of the first cutout 1020.

The lip 1460 defined by the first cutout on the upward facing surface of the upper part 705 is a protruding element that partially runs proximate to the perimeter of the upward facing surface of the upper part 705 of the rung attachment. When the pad is positioned within the recess of the upper part, the lip acts as a stop for retaining the pad within the area surrounded by the lip. The retention plate 1050 (further explained below) is configured to further facilitate maintaining the pad within the first cutout of the upper part and surrounded by the walls formed by the lip.

The retention plate 1050 may be a ring-shaped body. The retention plate may also include an angle that matches the angle of the downwardly angled portion section of the rung attachment so that the retention plate abuts the lip. In the present embodiment, the ring-shaped body is a rectangular shaped ring that is configured to be positioned such that in the fully assembled configuration when the retention plate is positioned over the pad the retention plate holds the pad in place on the upward facing surface of the upper part of the first attachment. The retention plate is configured to rest on top of the pad and abut the lip thereby locking the perimeter of the pad on top the upward facing side of the upper part so that the inwardly portions of the upward facing surface of the pad may interface with a foot of the user when the rung attachment is in the fully assembled configuration.

The downwardly angled section 750 defined by the upper part is configured such that an angle (represented by line A in FIG. 7) of at least ten degrees is formed relative to a second plane (represented by line A2 illustrated in FIG. 7) of the downwardly angled section and a first plane (represented by line A1 in FIG. 7) of the rung to which the rung attachment is connected. The angle of the downwardly angled section may also be 15 degrees or 20 degrees depending on the angle that ladder is configured to form relative to vertical back wall of the boat.

The upper part may also include a sidewall 1405 on each side end of the upper part of the rung attachment. The side walls span from the rearward end to the forward end of the upper part of the rung attachment. The side walls 1405 and downward facing side 717 surface define a cavity 1410 that is configured for housing at least one power source 1065 and electrical circuitry in conductive or electrical communication with and for powering a light emitting apparatus 1040. In the present embodiment, the light emitting apparatus is positioned within a cavity 1030 on the upward facing side of the upper part of the rung attachment.

The light emitting apparatus 1040 may be an encased in an elongated shaped housing encasing lights or may be strip of lights. The light emitting apparatus may be a variety of different types of devices that are configured for emitting light. The light emitting apparatus may include halogen bulbs, LEDs, incandescent bulbs, fluorescent bulbs, etc. Other types of bulbs or light emitting apparatus may also be used and are within the spirit and scope of the present invention. The housing of the light emitting apparatus may also be a variety of different shapes and configurations that may be received within cavity 1030. The light emitting apparatus is configured for emitting light that may be viewed outside of the rung attachment. The light emitting device or apparatus may be configured for emitting a variety of different amount of light depending on the application. The lights may also be a variety of different colors, a single color, or any combination thereof.

Figure 7:
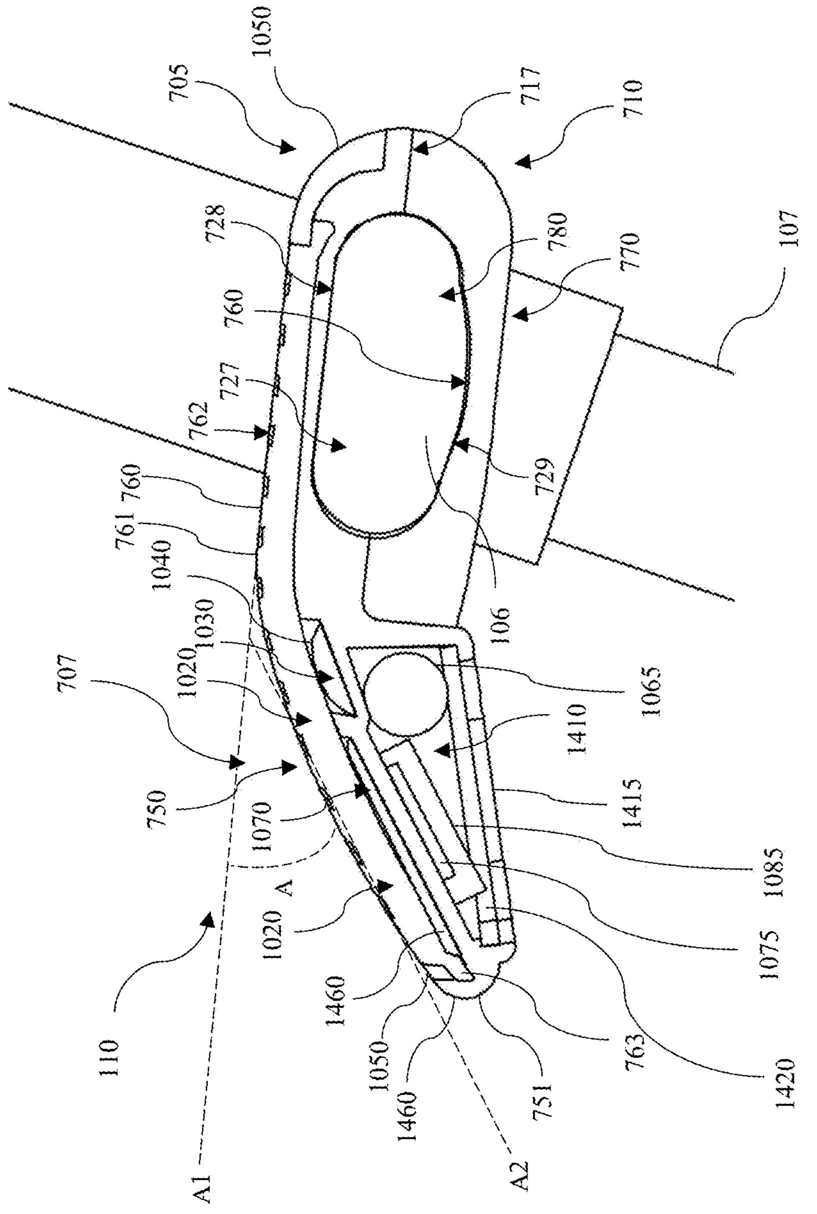
FIG. 7 is a side cross-sectional view of the rung attachment, according to an example embodiment.

The cavity 1030 may be an elongated shaped cutout spanning from side wall to side wall on the upward facing side of the upper part of the rung attachment. The cavity 1030 may have a planar bottom surface that is configured for having the light emitting apparatus being received. However, it is understood that other shapes and sizes of the cavity may be used and within the spirit and scope of the present invention. The cavity 1040 may be configured so that the when light emitting apparatus or device is positioned within the cavity 1030 the light emitting apparatus does not extend above the opening of the cavity (as illustrated in FIG. 7).

Cavity 1410 on the downward facing side of the upper part of the rung attachment is configured for housing at least one power source and electrical circuitry in conductive communication with the light emitting apparatus. The cavity 1410 may be defined by the sidewalls and the downward facing surface of the first rung attachment provided by the angle of the downwardly angled section. In the present embodiment cavity 1410 defines an elongated substantially triangular cross-sectional shape. However, other shapes may also be used and are within the spirit and scope of the present invention.

A cover or door 1415 configured to attach to the downward facing side of the upper part of the rung attachment such that the at least one power source and electrical circuitry is in conductive communication with the light emitting apparatus. The cover may include bosses having openings so that the cover may be attached to the downward facing surface of the upper part of the rung attachment. In the present embodiment, the cover is a substantially rectangular planar shaped body. The cover or door is configured to cover the cavity 1410 and maintain at least one power source and electrical circuitry use for powering and controlling the cavity 1410.

The gasket 1420 may be positioned between the cover and the cavity providing waterproofing of the cavity 1410 so that water, dirt, and other debris is prevented from entering the cavity. The gasket may be a sheet made of waterproofing type materials, such as silicone or other polymeric materials. However other types of gaskets may be used such as o-rings and any other type of sealing devices.

The power source may be a battery power source 1065. In the present embodiment, the battery power source may be a battery power source, such as a standard dry cell battery commonly used in low-drain portable electronic devices (i.e., AAA batteries, AA batteries, etc.). Other types of batteries may be used including rechargeable batteries, aluminum air batteries, lithium batteries, paper batteries, lithium-ion polymer batteries, lithium iron phosphate batteries, magnesium iron batteries etc. Additionally, other types of battery applications may be used and are within the spirit and scope of the present invention. For example, a battery stripper pack may also be used. Additionally, other types of power sources may also be used and are within the spirit and scope of the present invention.

A second power source 1085 also be used as a secondary power source for powering the light emitting apparatus or device. The secondary power source may include a LIPO or lithium iron polymer battery. However, other types of batteries may be used for the secondary power source as described above. The secondary power source 1085 is configured to be positioned within the cavity 1410 in conductive communication with the other electrical components and the light emitting device for powering the light emitting device.

The upward facing surface of the upper part of the rung attachment may also include cavity 1070. In the present embodiments, the cavity 1070 is configured for providing a recess so that a panel of photovoltaic or solar cells 1060 may be received within the cavity 1070. The panel 1060 is in conductive communication with the other electrical components and is also configured for providing power to the light emitting apparatus. On the upward facing side of the upper part for receiving a solar panel configured for providing a decorative element;

A controller or processor 1075 may be used for controlling the power from the power sources to the light emitting apparatus or device. The processor or controller may be housed within the cavity 1410 and in conductive communication with the light emitting apparatus. The processor may include a micro-processor having the necessary circuitry and components for performing its necessary functions. The central control unit may include volatile memory, such as RMA, or non-volatile memory, such as ROM, EPROM or flash memory. The processor included the control circuit that provides conduction paths to direct current between the various electrical components of the system, including the power sources and light emitting apparatus.

In certain embodiments, a control, button, or actuator 1305 (as illustrated in FIG. 12) is positioned on the outward facing surface of one of the sidewalls of the upper part of the rung attachment. The button is configured such that it is in conductive communication with the electrical components and circuitry within the cavity 1410 such that when actuated the light emitting apparatus may be controlled. However, it is understood that other means for turning on and off the light emitting apparatus may also be used in within the spirit and scope of the present invention.

In the present embodiment, in the fully assembled configuration, as illustrated in FIG. 7, the upper part of the rung attachment is attached to the upward facing side 728 of the rung 106 such that the downward facing side of the upper part of the rung faces downward when the rung is attached to a boat and in the fully extended configuration. In the fully assembled configuration, the upper part 705 of the rung attachment is configured to connect with the lower part of 710 of the rung attachment.

Referring to FIG. 7, the lower part of the rung attachment has an elongated U-shaped body defining and upward facing side 760 and a downward facing side 770. As illustrated in FIG. 7, the upper facing side of the lower part faces upwards and the downward facing side faces substantially downward when the lower part of the rung attachment is attached and the ladder is in the extended configuration and the ladder is configured for use by a user. The lower part defines a second channel 780 on the upward facing side. The second channel is configured to receive a downward facing side 729 of the rung 106 such that the upper part attaches to the lower part when the first channel 727 and second channel 780 receive the rung. One of the purposes of the lower part of the rung attachment is for coupling with the upper part so that the upper part is maintained on the rung. The upper part and the lower part may be coupled together using fasteners that pass through the bodies of the upper part and lower part thereby coupling the first and lower part together. In the present embodiment, the openings 1471, 1472 on both ends of the upper part that are configured to align with openings 1473, 1474 on both ends of the lower part when the upper part and lower part surround the rung. A U-shaped bolt 1010 having threaded terminal ends is configured for passing through openings 1471, 1472 and 1473, 1474 such that a fastener 1111 may be attached to the threaded ends so that the upper and lower parts may be coupled together. However, it is understood that other types of fasteners may be used and are within spirit and scope of the present invention.

Figure 5:
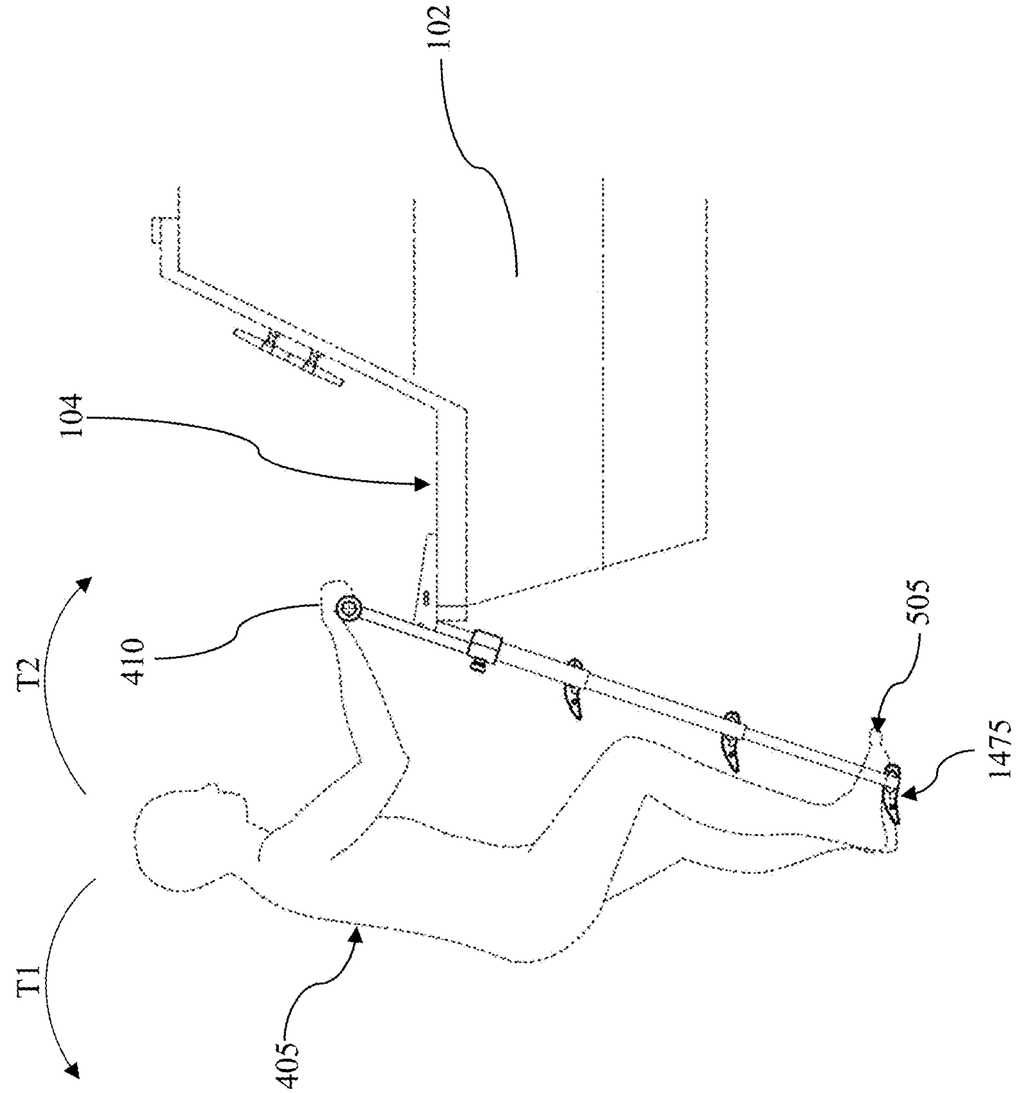
FIG. 5 is a side view of the attachments for a collapsible marine ladder, wherein the ladder is in the fully extended configuration and the rail extension and handgrip are in the extended configuration and wherein a user is in a second position ascending the ladder while using handgrips, according to an example embodiment.
Figure 6A:
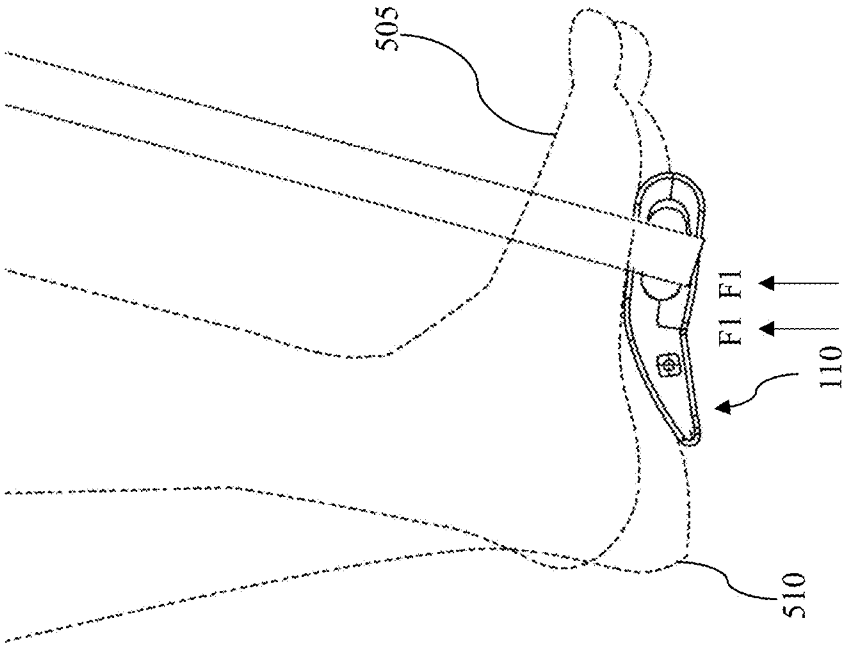
FIG. 6A is a side view of the rung attachment for a collapsible marine ladder, wherein the ladder is in the fully extended configuration, and wherein a user's foot is engaging the downwardly angled section of the rung attachment, according to an example embodiment.
Figure 6B:
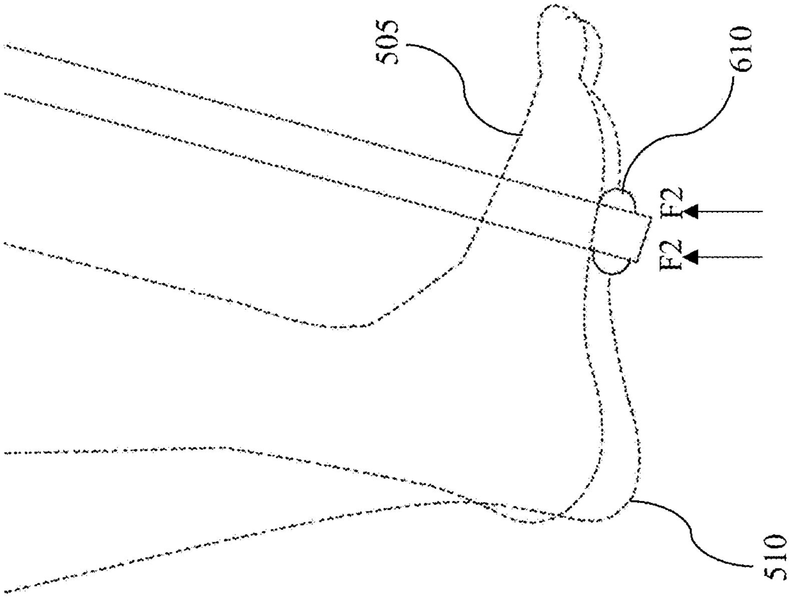
FIG. 6B is a side view of the prior art rung of a collapsible marine ladder, wherein the ladder is in the fully extended configuration, and wherein a user's foot is engaging the rung of the collapsible ladder, according to an example embodiment.

In the present embodiment, when the rung attachment is fully assembled and attached to the rung a width 1475 (as illustrated in FIG. 9) of the upper part is configured such when the rung attachment is installed on the rung it provides an increased amount of comfort to the user over the existing rung. The rung attachment because of the large with has a much greater surface area than the prior art rung 610 (as illustrated in (FIG. 5). As a result, the pressure (Pressure=Force/Area) or force F1 (illustrated in FIG. 6A) acting on an area of a foot of a user ascending the ladder due to the gravity and the downward force provided by the user's foot is less than a pressure or second force F2 (illustrated in FIG. 6B) acting on the area of the foot of the user ascending the ladder due to the gravity and the downward force provided by the user's foot when the rung attachment is not installed on the rung (illustrated in 6B).

Figure 10A:
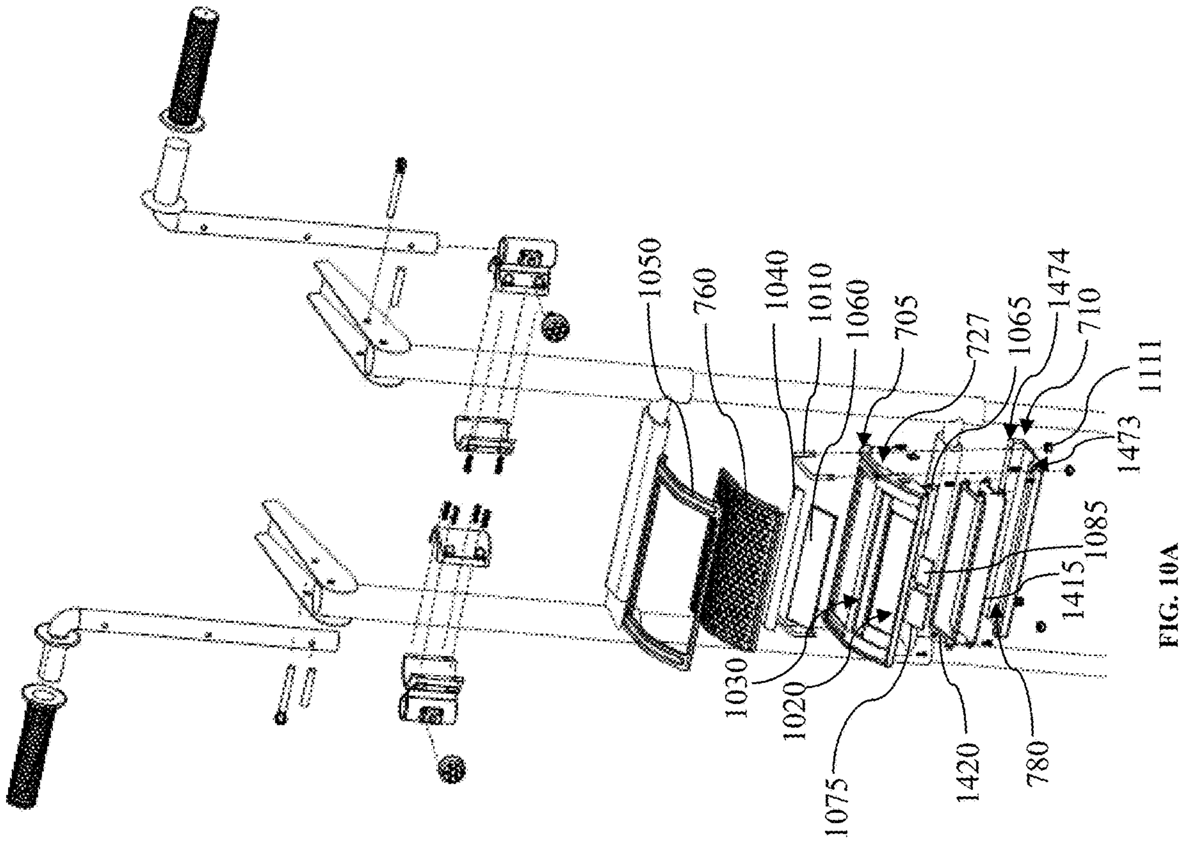
FIG. 10A is an exploded perspective view of the attachments for a collapsible marine ladder, wherein the ladder is in the fully extended configuration and the rail extension and handgrip of the attachment are in the extended configuration, according to an example embodiment.
Figure 10B:
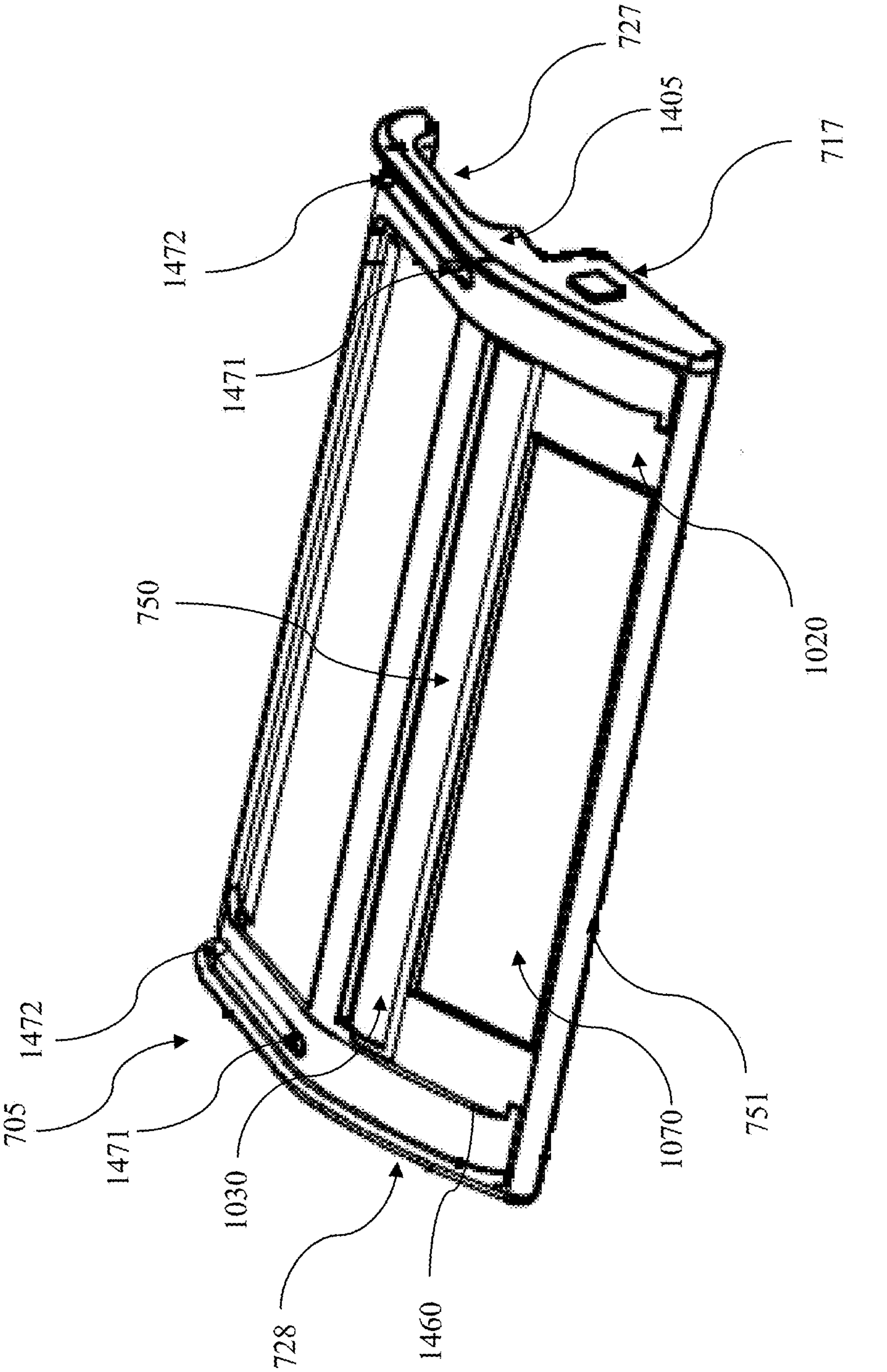
FIG. 10B is a perspective view of the upper part of the rung attachment, according to an example embodiment.
Figure 10C:
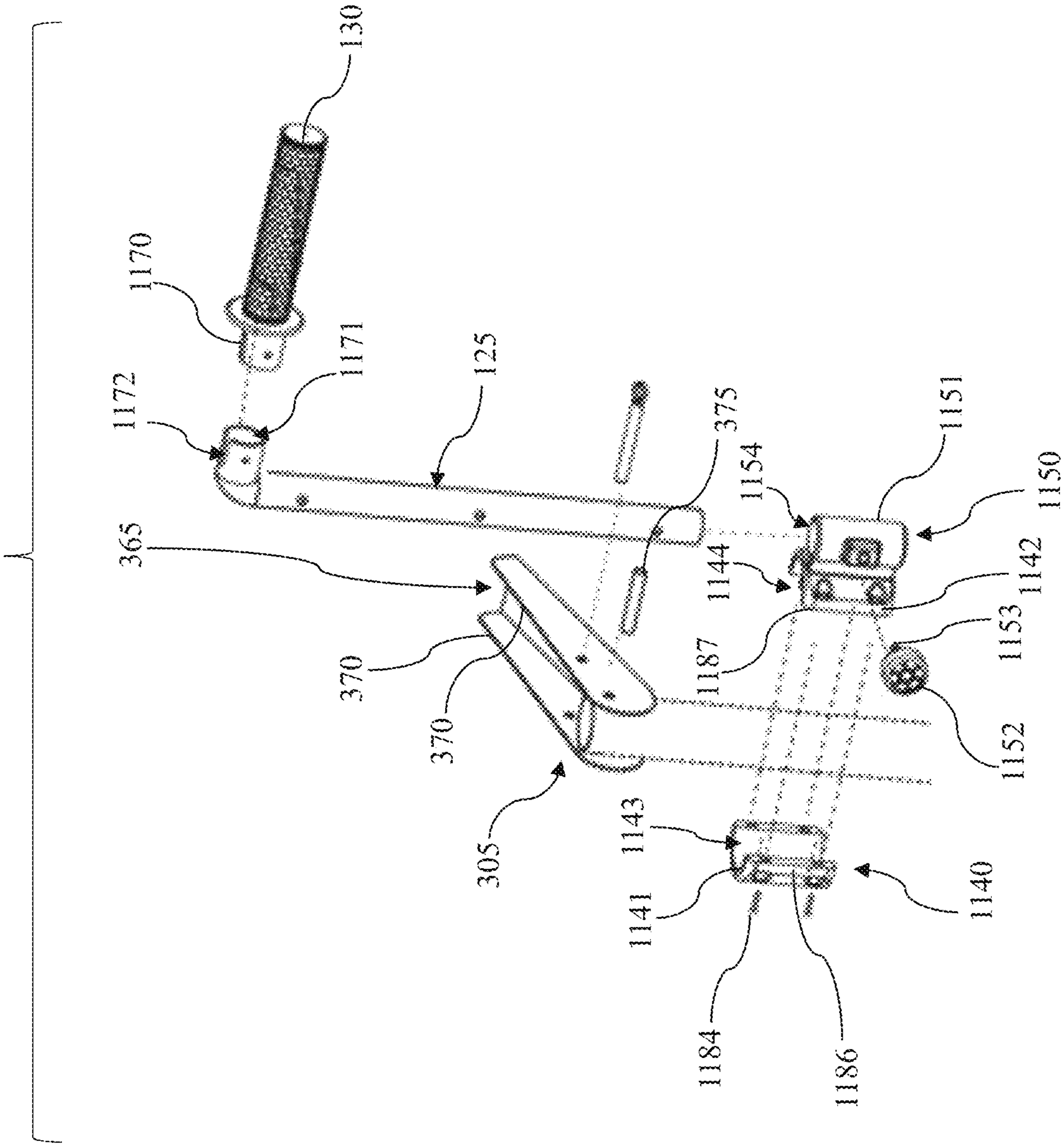
FIG. 10C is an exploded perspective view of the rail attachment proximate to the rail of the collapsible ladder, according to an example embodiment.
Figure 10D:
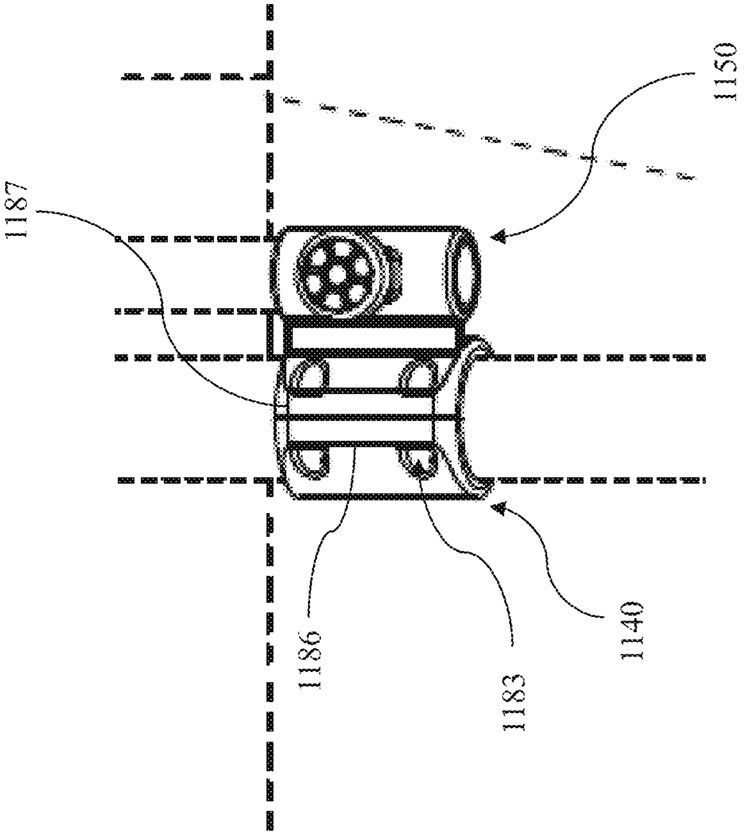
FIG. 10D is a perspective view of the rail attachment attached to the rail of the collapsible ladder, according to an example embodiment.

FIGS. 10C-11 will be discussed together. FIG. 10C is an exploded perspective view of the rail attachment 120, according to an example embodiment. FIG. 10C is an exploded perspective view of the rail attachment 120, according to an example embodiment. FIG. 10C is an exploded perspective view of the rail attachment proximate to the rail of the collapsible ladder, according to an example embodiment. FIG. 10D is a perspective view of the rail attachment attached to the rail of the collapsible ladder, according to an example embodiment. As mentioned above, each of the rail attachments 120 are configured for attaching to a portion of the ladder. The rail receiving element 1140 of the rail attachment is configured for attaching the rail attachment to the body of the rail. In the present embodiments, the rail segment 307 is an elongated cylindrical shaped body. However, it is understood that the rail receiving element of the rail attachment may be configured for attaching a variety of cross-sectional diameters. The rail receiving element of the rail attachment comprises a first U shaped body 1141 having a first channel 1143 that are configured to attach to the second U shaped body 1142 having a second channel 1144. The first channel and second channels of the rail receiving elements are configured for receiving the rail so that the first U shaped body may attach to the second U shaped body. A gripping surface may be attached to the first channel and second channel so that the first and second U shaped bodies hold firmly against the rail segment and prevent movement or translation of the rail receiving element of the rail attachment relative to the rail. In one embodiment, the first U shaped body and second U shaped body of the rail receiving element may include flanged portions 1186, 1187 having openings 1183 so that fasteners 1184 may pass through and couple the first U shaped body to second U shaped body. In the fully assembled configuration, the rail receiving element 1140 is configured to attach so that the rail attachment does not translate along the longitudinal axis of the body of the rail or rotates around a center point of the rail. As mentioned above, gripping elements or features may be included along the channels of the U-shaped body so that the rail receiving element of the rail attachment to does not translate relative to the rail.

The rail attachment 120 further includes an extension receiving element 1150 that receives a rail extension 125. In the present embodiments, the extension receiving element is defined by a tubular shaped body 1151 attached to one of the U-shaped bodies of the rail receiving element of the rail attachment. The tubular shaped body 1151 defines a channel 1154 that spans the entire length of the tubular shaped body 1151. The channel 1154 for the tubular shaped body is configured for receiving the cross-sectional diameter of the rail extension. In the present embodiment, the rail extension is an elongated cylindrical shaped body. The channel 1154 of the extension receiving element of the rail attachment is cylindrical so that it may receive the shape of the rail extension. However, it is understood that other shapes besides the cylindrical shaped rail may be used and are within the spirit and scope of the present invention. The body of the extension receiving element of the rail attachment further comprises a threaded opening 1156 along the body that passes through into the channel 1154. A knob 1152 having a screw or threaded elongated element 1153 attached to the knob is configured to be threaded through the threaded opening 1156 such that it contacts the body of the rail extension 125. In operation, a user may apply rotational force to move the screw inward into the channel 1154. In the fully assembled configuration, when the body of the rail extension 125 is received within channel 154, the end of the threaded screw 1153 abuts the body of the rail extension causing frictional force to prevent the body of the rail extension from translating relative to the extension receiving element of the rail attachment. Additionally, if a user desires to adjust the position of the rail extension relative to the extension receiving element of the rail attachment, then the user may apply rotational forces to knob 1152 so that the threaded screw 1153 moves outward out of the channel 1154 so that frictional forces do not prevent the body of the rail extension from moving so that the position of the rail extension may be adjusted relative to the extension receiving element of the rail attachment. However, it is understood that other means of maintaining the rail extension in a single position relative to the extension receiving element and moving the rail extension relative to the extension receiving element may be used and are within the spirit and scope of the present invention.

Figure 8:
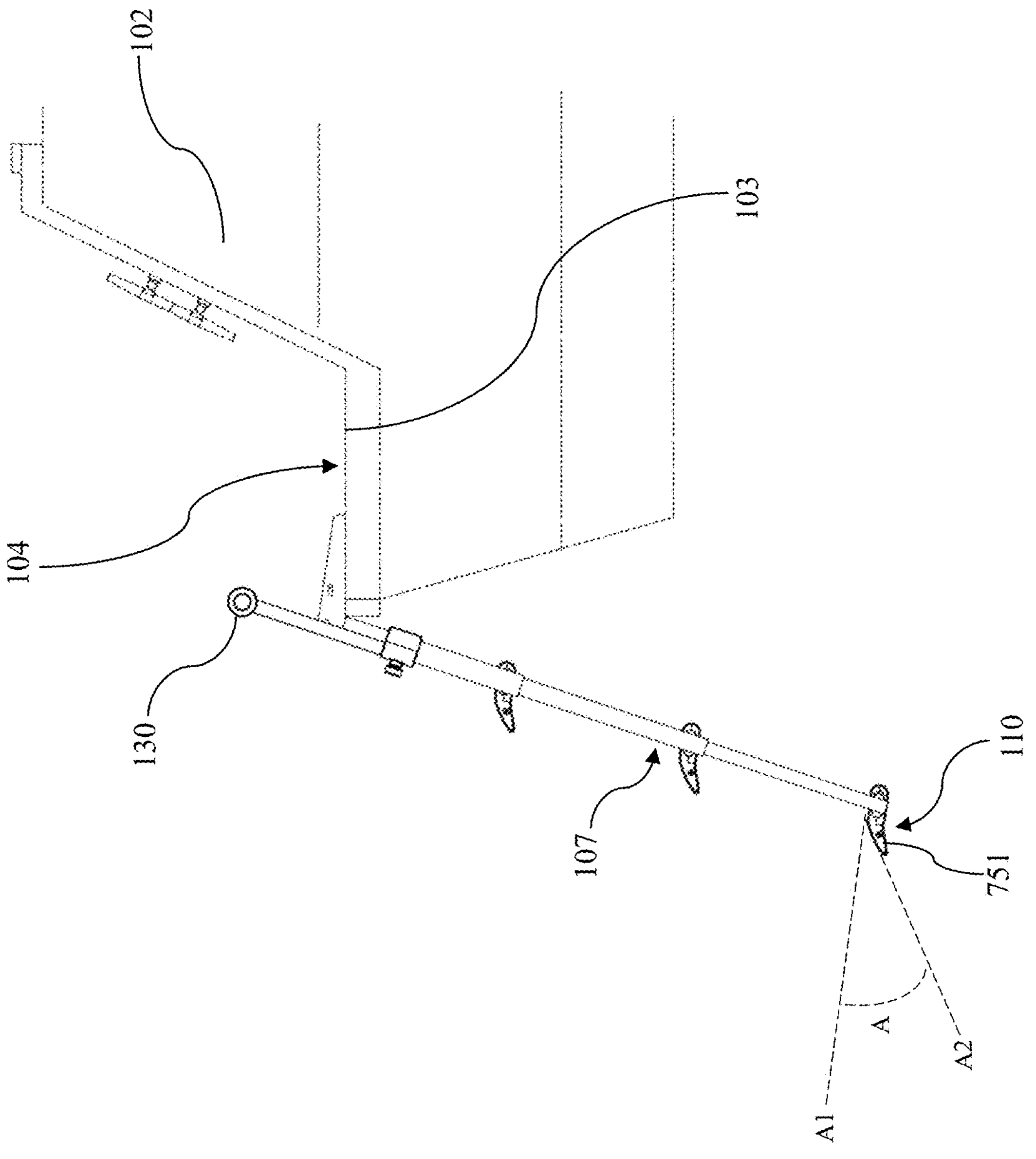
FIG. 8 is a side view of the attachments for a collapsible marine ladder, wherein the ladder is in the fully extended configuration and the rail extension and handgrip are in the extended configuration, according to an example embodiment.

One of the inventive features of the invention is that the present embodiment provides an extendable rail extension that can be used for collapsible ladders. One of the issues in the nautical environments is space and the ability for items to be secured when traveling. In the present embodiments, in the fully extended configuration (for example in FIGS. 1, 4, and 8), the rail extension can be positioned such that the handgrip 130 is positioned above the upper end of the rail and the dive platform to which the ladder is attached. Having the handgrips above the upward facing surface of the dive platform makes it much easier for a user to climb up the ladder. In the fully extended configuration, because the handgrips are positioned parallel to and above the dive platform, a user can more easily full oneself out of the water. Many times when a ladder is being used, a person is floating in the water. It will be much easier for a person to utilize at least one of their arms so that the amount of force required by a person's legs and lower body is decreased. The pulling action or upward force provided by a person's upper body when a person is holding the handgrips when the rail extension is in the fully extended configuration is much greater than when a user must use force on the rails of the ladder or rungs of the ladder that are positioned below or proximate to the dive platform. Because of the greater amount of force and leverage provided by using the handgrips when the rail extension is in the fully extended configuration, the amount of force a user needs to apply with their legs and lower body is much less. The result is that a user can more easily ascend the ladder and out of the water.

Figure 4:
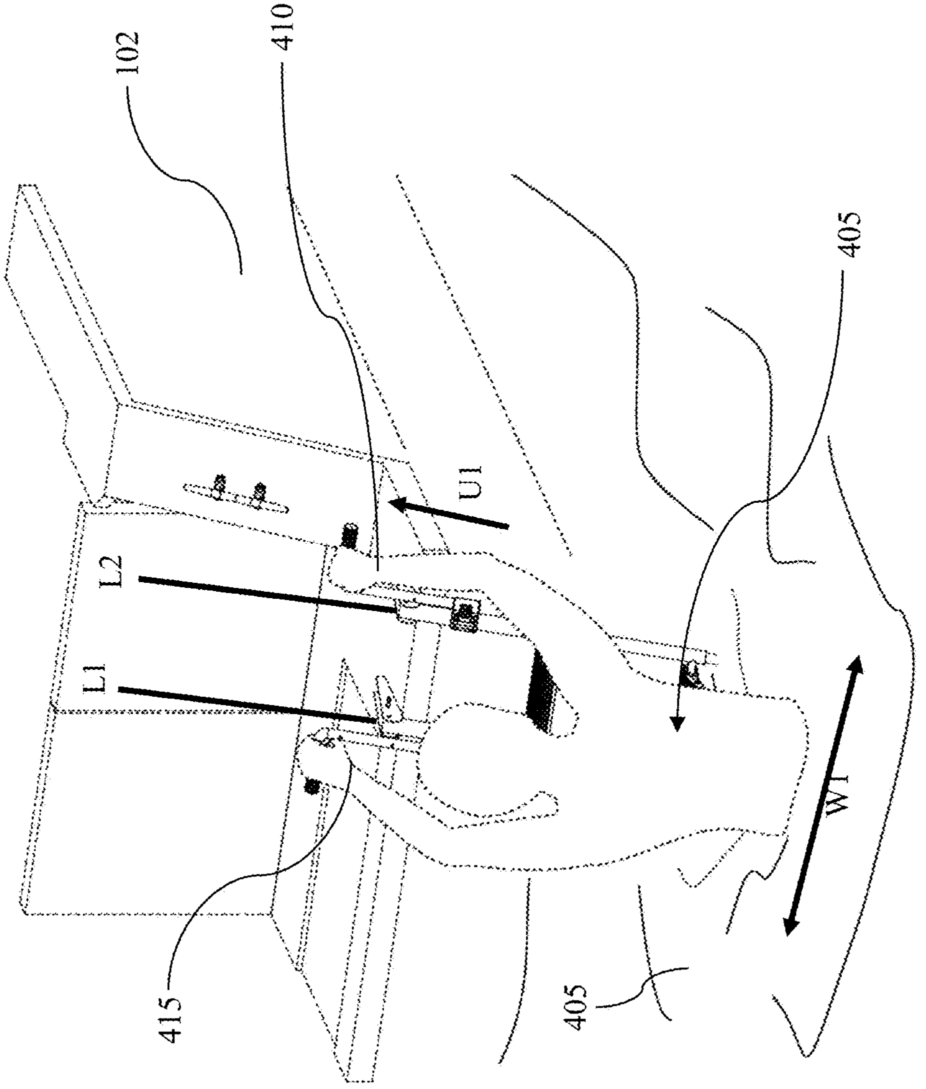
FIG. 4 is a perspective view of the attachments for a collapsible marine ladder, wherein the ladder is in the fully extended configuration and extending into water, wherein rung attachments are attached to the rungs and the rail extension and handgrip are in the extended configuration and wherein a user is in a first position ascending the ladder while using handgrips, according to an example embodiment.

In the present embodiment, the handgrip is substantially perpendicularly aligned to the body of the rail extension 125 in the fully extended configuration (as illustrated in FIG. 1). The handgrip is configured such that in the fully extended configuration, the handgrip protrudes outward relative to the side of the rail extension. The handgrips are configured for allowing the user to provide a surface outside of longitudinal axis L1, L2 (illustrated in FIG. 4) of ladder rails 107 when the handgrips are in the fully extended configuration such that the longitudinal axis of the handgrip is perpendicular with the longitudinal axis of the rail attachment. Having handgrips outside the rails and above the dive platform provides an increased amount of sturdiness to the user over simply grabbing a portion of the ladder rail or ladder rung. Having the handgrips horizontally aligned in the fully extended configuration and above the dive platform (as illustrated in FIG. 4) provides the user an improvement over having surface to hold in line with the longitudinal axis of the ladder rails, which decreases the user from swaying side to side (represented by arrow W1 in FIG. 4) when ascending the ladder out of the water.

The handgrip may be integral with or may be attached separately to the body of the rail extension and may be in a fixed position such that it cannot be collapsed. In other embodiments, the handgrip is collapsible such that a longitudinal axis (represented by line B in FIG. 11) of the handgrip is substantially parallel with a longitudinal axis (represented by line C in FIG. 11) of the rail extension. In one embodiment, the handgrip is a substantially elongated cylindrical shaped body. However, it is understood that other shapes may also be used and are within the spirit and scope of the present invention. The body of the handgrip may be covered with material having gripping type properties such as NVPC foam, EPDM or the types of materials. It is also understood that other types of materials may be also used in spirit and scope of the present invention. In embodiments having collapsible handles (such as illustrated in FIG. 11), a U-shaped body 1205 defining a parallel wall section may be configured for receiving an elongated shaped section 1210 at the end of the handgrip so that the body of the handgrip may pivot relative to the rail extension. Additionally, a pin 1215 may be configured for locking the body of the handgrip in the fully extended configuration or in the collapsed configuration (illustrated in FIG. 11). In other embodiments, the handgrip may be completely removable so that the handgrip may be attached and un-attached. For example, in the present embodiment, the pin 1215 may be removable so that the body of the handgrip may be removed from the u-shaped body 1205 of the ends of the rail attachment so that the handgrip may move from an assembled configuration and a unassembled configuration.

The downwardly angled section 750 and width 1475 of the rung attachment combined with the handgrips positioned above the dive platform in the fully extended configuration provide a further improvement over the existing prior art. Typically, when a user is using a collapsible marine ladder a portion of the ladder is submerged in water. FIG. 4 illustrates the boat 102 floating on water 411. The collapsible ladder is fully extended such that the segments of the ladder extend downward and into the water. Additionally, in FIG. 4, the handgrips are positioned above the upward facing surface 104 of the dive platform 103. Because typically collapsible marine ladders are used for users to ascend out of water, when a user initially begins ascending the ladder a user is swimming or wading in water. Many times, when a person is swimming or wading in water, the user does not know exactly the position of the ladder rungs and may be forced to position the user's foot without physically being able to see where the user positioning their foot. Additionally, because a person or is typically swimming or wading in water, the user will grasp the ladder with their hands before positioning their feet on the ladder. The large area of the upward facing surface of the upper part of the rung attachment and angle provided by the downwardly angled section makes it much easier to locate each of the rungs, especially the rungs under the water outside the line of sight of the user.

Figure 6C:
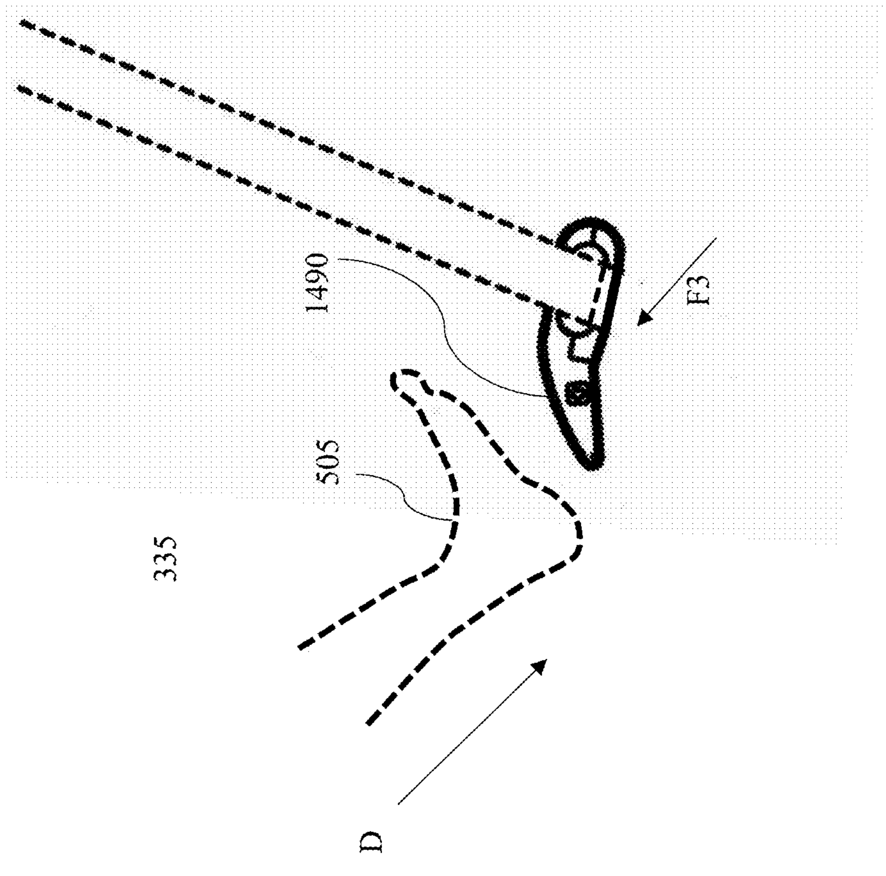
FIG. 6C is a side view of the rung attachment attached to a ladder and a user's foot moving towards the rung attachment, according to example embodiment.
Figure 6D:
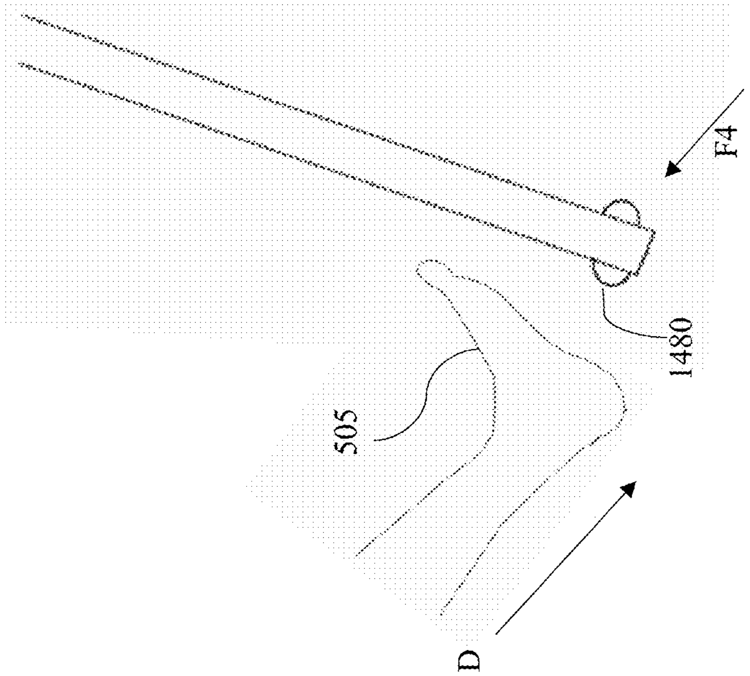
FIG. 6D is a side view of the prior art rung attached to a ladder and a user's foot moving towards the rung, according to example embodiment.

Additionally, because the user is typically swimming or wading in the water, when a person begins climbing the ladder, the person or user will hold on to a portion of the ladder rail or rung and then swing their lower body inward and foot downward in order to position their foot on the ladder rung. This results in the foot moving toward the rung in a generally downwardly angled orientation. FIGS. 6C and 6D is an example of how a foot may be moving towards the rung of the ladder when a user is trying to first position their foot onto the ladder. As mentioned above, when a person is wading or swimming and trying to climb a ladder, they may initially grab onto a portion of the ladder. Next, the person will swing their lower body and legs such that the foot and lower legs move in the generally downward direction toward the rung. The generally downward direction is represented as line D in FIGS. 6C and 6D). FIG. 6C is a side view of the rung attachment attached to a ladder and a user's foot 505 moving towards the rung attachment (in the direction represented by line D), according to example embodiment. FIG. 6D as a side view of the prior art attached to a ladder and a user's foot 505 moving towards the rung (in the direction represented by line D), according to example embodiment. FIG. 6D illustrates that the user's foot when moving in the direction of line D towards the rung would likely strike a somewhat apex portion or pointed portion 1480 of the ladder of the prior art. The apex portion 1480 may cause pain to the user if a user's foot is moving towards the apex portion in the direction of line D with enough force. On the other hand, FIG. 6C illustrates that the user's foot when moving in the direction of line D towards the rung would likely engage the upward facing surface 1490 of the downwardly angled section and upper part of the rung attachment due to at least ten degree angle of the downwardly angled section, which is not apexed or pointed, so that a larger surface area of the user's foot engages the upper facing surface of the rung attachment thereby decreasing the amount of force acting on a user's foot which increases the comfort provided to the user and decreases the amount of potential pain on the user with initial foot engagement. In other words, the resulting forces (F3 illustrated in FIG. 6C) acting on an area of a foot of a user initially ascending the ladder with the rung attachment attached to the rung is less than the resulting forces (F4 illustrated in FIG. 6D) acting on the area of the foot of the user ascending the ladder when the rung attachment is not installed on the rung because the angle of the rung provides a greater surface area for the user's foot to initially engage than the apex portion of the rung.

The handgrip position of the rail attachment above the dive platform in the fully extended configuration is also a further improvement over the existing prior art because it allows the user to have a better center of gravity preventing toppling of the user. Many times when a ladder is being used, a person is floating in the water. It will be much easier for a person to utilize at least one of their arms so that the amount of force required by a person's body is more evenly distributed. When a person is initially exiting the water (as illustrated in FIG. 1) the pulling action or upward force provided by a person's upper body (represented by Line U1 in FIG. 4) when a person is holding the handgrips when the rail extension is in the fully extended configuration is much greater than the pulling action or upward force provided by a person's upper body (not shown) when a user applies force on the rails of the ladder or rungs of the ladder that are positioned below or proximate to the dive platform. Because of the greater amount of force and leverage provided by using the handgrips when the rail extension is in the fully extended configuration, the amount of force a user needs to apply with their legs and lower body is much less when a person is initially exiting the water. As a result, the amount of force provided by the user is more evenly distributed across a user's body and a user can more easily initially ascend the ladder and out of the water. Additionally, as a person begins exiting the water, as illustrated in FIG. 5, the handgrips being positioned above the dive platform of the boat provide a greater amount of stability than the amount of stability provided if a person is forced to position their hands on the dive platform or in a position below the dive platform. Referring to the prior art, because the handgrip above the platform is not available, a person's stability is reduced (when compared with the present invention) when ascending the ladder because a person's hands must be positioned below or on the dive platform. When a person's hands are positioned on or below the dive platform, a person's body will tend to pivot (for example in either the forward direction (represented by Line T1 in FIG. 5) or rearward direction (represented by Line T2 in FIG. 5)) causing the person to lose balance and potentially toppling or falling off the ladder. Additionally, this instability is further exaggerated if a boat is rocking or moving due to the wave action of the water in which the boat is floating.

Figure 13:
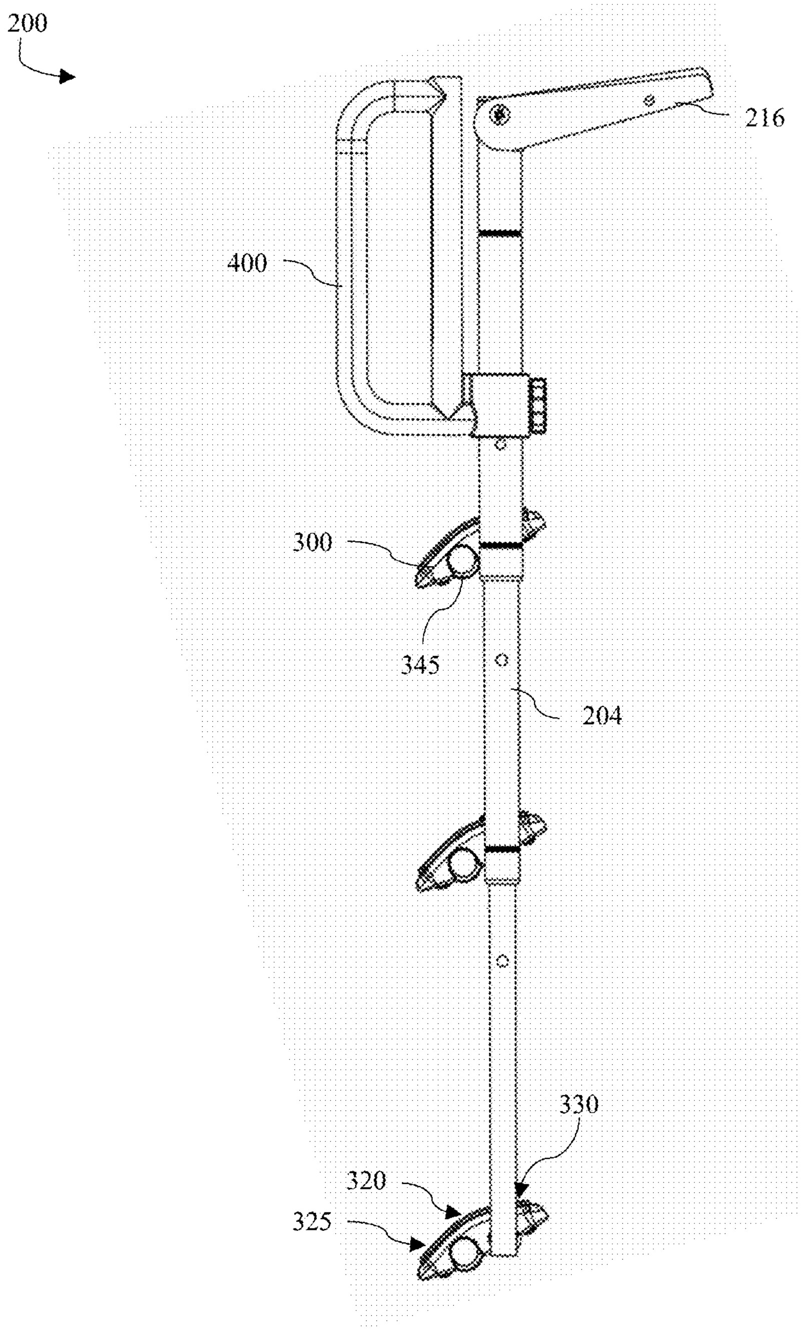
FIG. 13 is a side view of attachments for a collapsible marine ladder, wherein the ladder is in the deployed configuration, according to an example embodiment.
Figure 14:
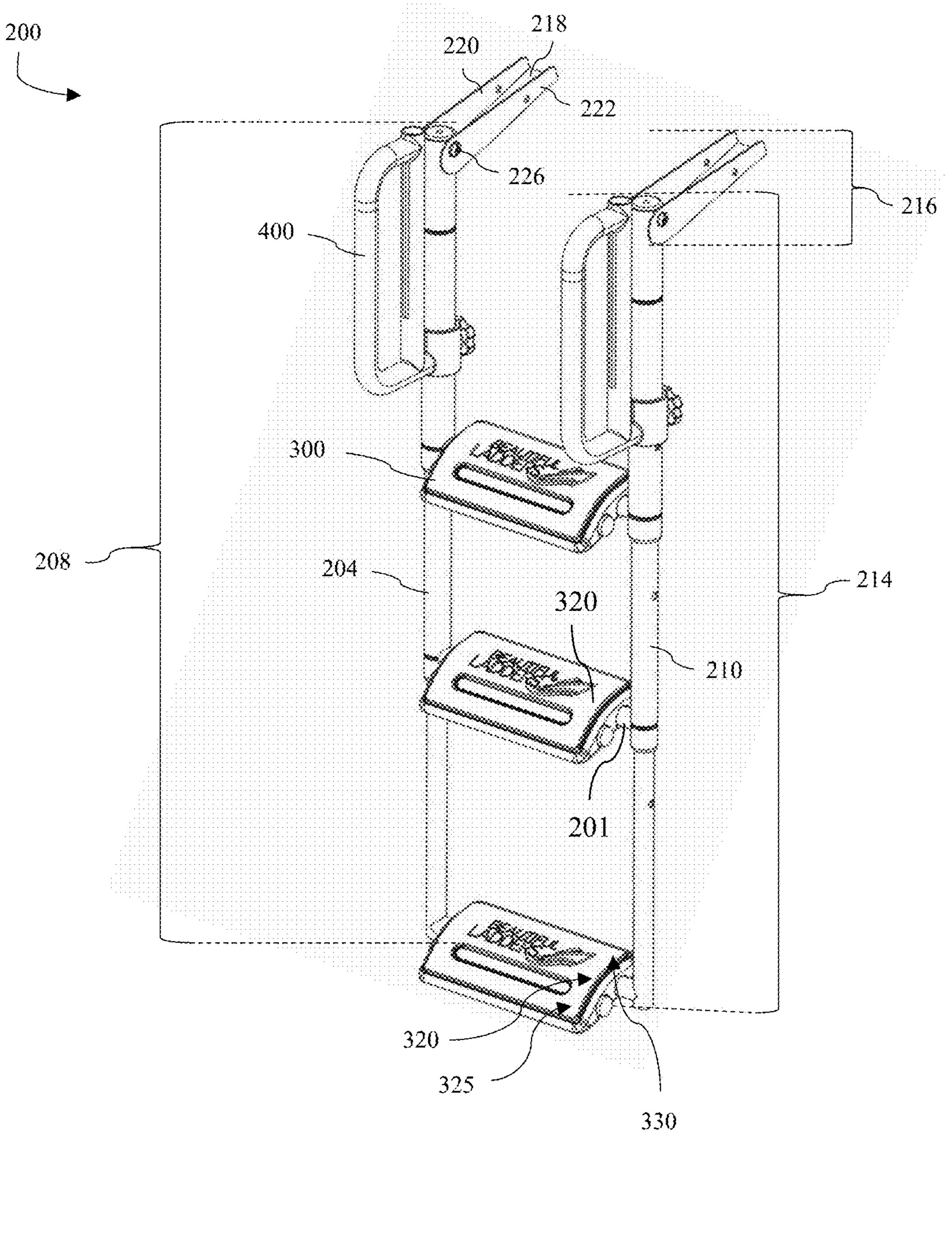
FIG. 14 is a perspective view of attachments for a collapsible marine ladder, wherein the ladder is in the deployed configuration, according to an example embodiment.
Figure 16:
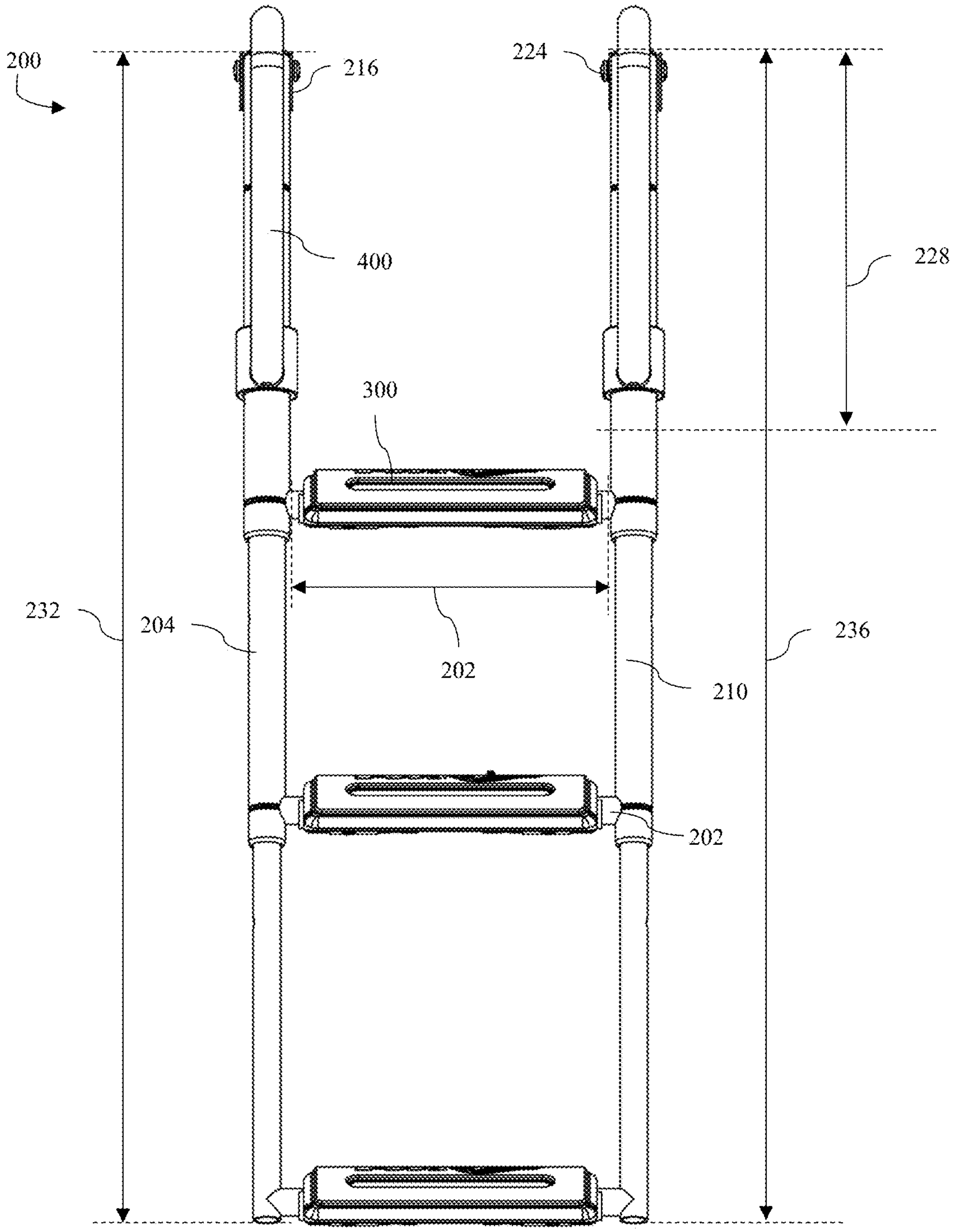
FIG. 16 is a front view of attachments for a collapsible marine ladder, wherein the ladder is in the deployed configuration, according to an example embodiment.

Referring now to FIGS. 13 and 16, views of attachments for a collapsible marine ladder 200, wherein the ladder is in the deployed configuration, are shown, according to an example embodiment. FIG. 13 is a side view of attachments for a collapsible marine ladder, wherein the ladder is in a deployed configuration, according to an example embodiment. FIG. 16 is a front view of attachments for a collapsible marine ladder, wherein the ladder is in the deployed configuration, according to an example embodiment. The ladder includes a stowed configuration and the deployed configuration. When the ladder has the stowed configuration, a user may store the ladder more efficiently because the ladder is more compact and takes less space. When the ladder is in the deployed configuration, the user may set up the ladder in attachment with a part of the boat, such as the stern of the boat, and step onto the ladder. It is understood that the ladder may be in attachment with other parts of a marine vessel. The ladder comprises a first rail, a second rail, and a plurality of rungs 201. The plurality of rungs is in attachment with the first and second rail such that the plurality of rungs is perpendicular to the first rail and the second rail, and the first rail and second rail are parallel to each other. Each rung of the plurality of rungs has a rung length 202 spanning between the first rail and the second rail. The ladder further comprises a plurality of first rail segments 204 telescopically arranged defining the first rail so that the first rail can move between a first rail stowed configuration 206 and a first rail deployed configuration 208. A plurality of second rail segments 210 is also telescopically arranged defining the second rail so that the second rail can move between a second rail stowed configuration 212 as illustrated in FIG. 20B and a second rail deployed configuration 214 as illustrated in FIG. 14. The plurality of first rail segments and the plurality of second rail segments may be hollow such that the bottom of each rail segment is configured to receive another rail segment. Telescopically arranged is defined by an above rail segment having a hollow diameter greater than the diameter of the rail segment immediately below allowing the below rail segment to slide within the above rail segment. However, other embodiments for telescopically arranging the segments may be used and are within the spirit and scope of the present invention. Each of the first rail segments comprises the same dimensions of its paired second rail segment.

A rung attachment 300, or step of the ladder, configured to allow a person to comfortably step onto the ladder is attached to each of the plurality of rungs. The rung attachment includes a first section, second section, and third section. The first section is convexly curved to fit the arch of a person's sole, which is the surface on the bottom of a foot. The first section includes a peak or apex at the highest point of the curve when the first section is horizontal. The second section and third section are cojoined on opposite sides of the first section and may be curved or flat. Because the second section and third section extend from the sides of the first section and the first section is outwardly curved, the first section and third section are downwardly angled from the first section. The downwardly angled second section and third section extends the convexity of the first section similar to the arch of a person's sole. The outward curvature of the top surface helps reduce the forces acting against a specific point of the user's sole by distributing the normal forces of the rung attachment when the user steps onto the ladder. A plate 345 attaches by at least one plate fastener 350 to the bottom section of the first rung to keep the rung attachment attached to the rung. It is understood that multiple fasteners may be used to attach the rung attachment to the rung. It is also understood that there is a plurality of plates in attachment with the ladder because each of the rung attachments are in attachment with a plate.

In the present invention, each rung attachment may be configured such that the rung attachment moves between the stowed configuration and deployed configuration. The rung attachment includes a bottom section 380 that comprises the plate, which is below the rung attachment body, and is opposite to the top surface. A front section 382 of the bottom section is below to the first section and proximate to the second recess 335. When the ladder is in the stowed configuration, the front section of the bottom section of an above rung attachment is near the third section of the rung that is underneath the above rung attachment as illustrated in FIG. 20B so that adjacent rung attachments nest against each other.

Referring now to FIG. 14, a perspective view of attachments for a collapsible marine ladder, wherein the ladder is in the deployed configuration, is shown, according to an example embodiment. A bracket 216 is hingedly in attachment with a rail upper end portion of the first rail and the second rail. Hingedly in attachment means the bracket may rotate from a fixed point on the rail of the ladder. Because the ladder has two rails, the ladder may comprise at least two brackets. A base 218 of the bracket is configured to be in attachment with a marine vessel. The base may be attached by fasteners with the stern of a boat. However, it is understood that the base may be in attachment with other portions or locations of a marine vessel. A first bracket body 220 extends upward from the base. A second bracket body 222 is opposing and spaced apart from the first bracket body extending upward from the base. The first bracket body and second bracket body may be a substantially planar shaped body however other shapes may be used and are within the spirit and scope of the present invention. A first bracket fastener 224 for movably connecting the rail upper end portion to the first bracket body. A second bracket fastener 226 for movably connecting the rail upper end portion to the first bracket body. The fasteners secure the bracket to rail upper end portion while allowing the bracket to hingedly rotate around the fastener and parallel to the rail.

Figure 15:
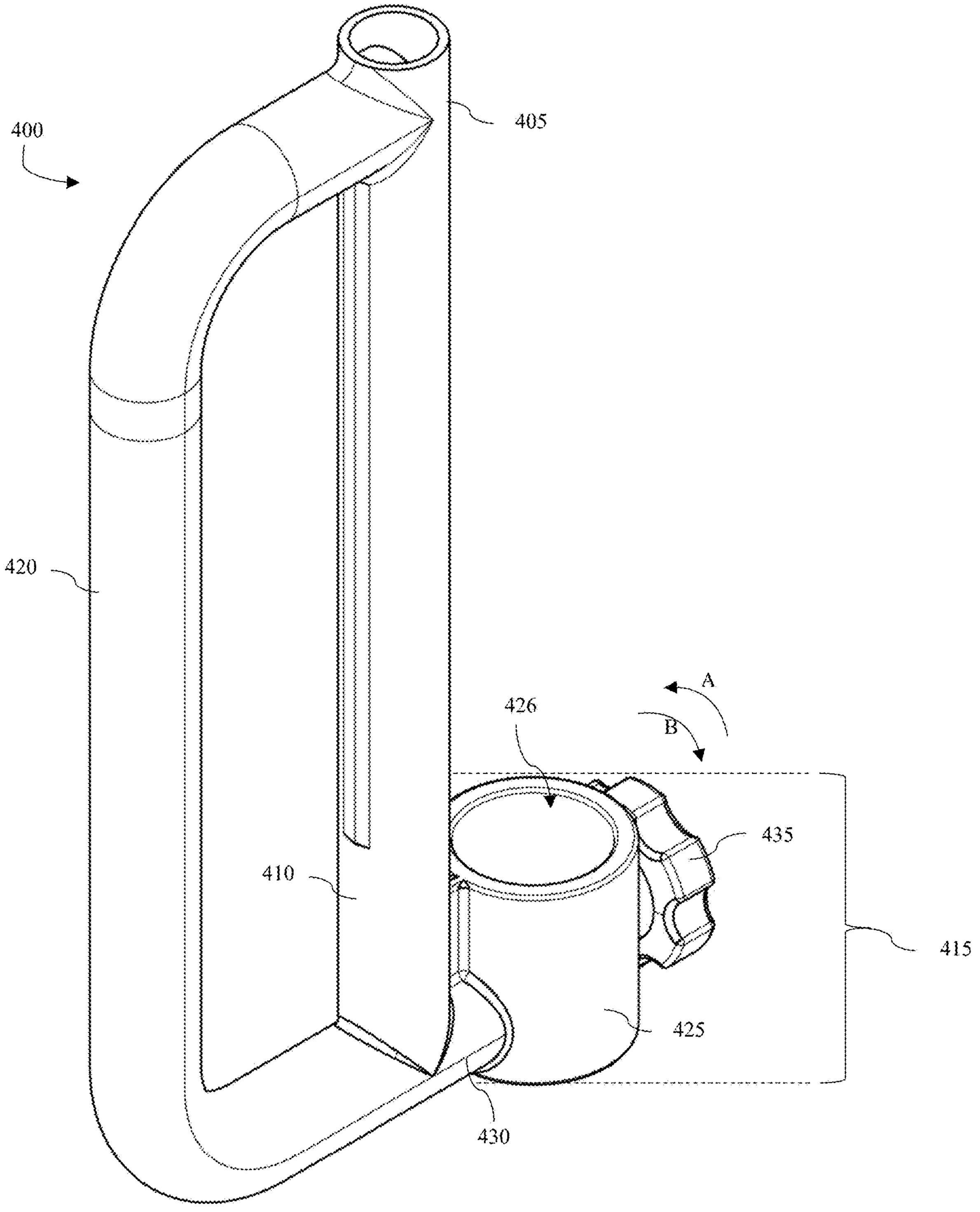
FIG. 15 is a perspective view of a rail attachment, according to an example embodiment.

Referring now to FIG. 15, a perspective view of a rail attachment 400 is shown, according to an example embodiment. The rail attachment is adjustably attached to a rail upper end portion 228 of at least one of the first rail and the second rail. Adjustably attached means that the user may change the positioning of the rail attachment to any part of the rail upper end portion. The rail upper end portion includes part of the rail segment above the topmost rung allowing the user of the ladder to hold the rail attachment with their hands. The rail attachment comprises a rail attachment upper portion 405 and a rail attachment lower portion 410, a rail receiving element 415 at the rail attachment lower portion, and an arm 420 in attachment with and extending upward relative to the rail receiving element. In other words, the arm 420 may be parallel with the elongated body that the defines the rail attachment lower and upper portions. The arm is configured to allow the user to grasp the rail attachment by the arm. An elongated-shaped body having a first end may define the rail attachment lower portion, and a second end of the elongated-shaped body may define the rail attachment lower portion. The elongated-shaped body may be cylinder-shaped, and the arm may be u-shaped such that one end of the arm is in attachment with the first end of the elongated-shaped body while another end of the arm is in attachment with the second end of the elongated-shaped body. The arm and the elongated-shaped body may be hollow or, in other embodiments, completely solid. The arm and the elongated-shaped body may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, However, other types of materials may also be used and are within the spirit and scope of the present invention. The arm and the elongated-shaped body may be formed from a single piece or from several individual pieces joined or coupled together. The components of the arm and the elongated-shaped body may be manufactured from a variety of different processes including an extrusion process, a mold, welding, shearing, punching welding, folding etc. However, other types of processes may also be used and are within the spirit and scope of the present invention.

The rail receiving element is configured for adjustably attaching the rail receiving element to the rail upper end portion of at least one of the first rail and the second rail. The rail receiving element is tubular shaped body having a channel 426 to allow a rail segment to be inserted into the rail receiving element. The rail receiving element is adjustably attached to the rail upper end portion in order to be positioned above the topmost rung because the user needs to pull themselves up while stepping on the rung attachments. The rail attachment further comprises at least one wall 425 defined by the rail receiving element for contacting the rail upper end portion and the second arm 430 extending radially outward frons the rail receiving element and connecting the arm to the rail attachment. The second arm is in attachment with a part of the rail attachment lower portion where the arm is in attachment with the first end of the elongated-shaped. The second arm extends the one end of the arm that is in attachment with the first end of the elongated body. The rail attachment also includes a securing means having a handle 435 for removably securing the at least one wall of the rail receiving element to the rail upper end portion. The rail attachment may also include a third arm at the upper end of the rail attachment that attaches the upper end of arm 420 to the upper end of the trail attachment.

The securing means may adjustably shorten the distance between the at least one wall to create a gripping force by the rail receiving element and onto the rail upper end portion. The securing means may also adjustably increase the distance between the at least one wall allowing the second arm to rotate perpendicular around the rail upper end portion and inherently allowing the rail attachment to rotate around the rail. The rail attachment is rotated depending on whether the collapsible marine ladder is in the deployed configuration or the stow configuration. The rail securing means may be a device configured to prevent the rail attachment from moving relative to the rail. For example, the rail securing means may be a clamping feature, a screw or other type of fastener. In one embodiment, the securing means may include a threaded shaft that is inserted into a threaded opening on wall 25 that provides access into the channel 426. Handle 435 may be attached to an end of the threaded shaft such that when force is applied to the handle to turn the handle in one direction (such as in the direction of arrowed line A in FIG. 15) a force causes a second end of the threaded shaft to move inward such that the threaded shaft engages the rail segments of the rail to which the channel is proximate to thereby preventing movement of the rail attachment relative to the rail segment. When force is applied to the handle to turn the handle in a second direction (such as in the direction of arrowed line B in FIG. 15) the force in the second direction causes a second end of the threaded shaft to move outward such that the threaded shaft moves away from the rail segments of the rail to which the channel is proximate to so that the rail securing means may be loosened so that the rail attachment may be adjusted relative to the rail segment. It is understood that other embodiments may be used and are within the spirit and scope of the present invention.

Referring now to FIG. 16, a front view of attachments for a collapsible marine ladder, wherein the ladder is in the deployed configuration, is shown, according to an example embodiment. The ladder includes a rail deployed configuration in which the arm 420 of the rail attachment 400 is not at least partially between the first rail and the second rail. In other words, in the deployed configuration a part of the rail attachment—the arm 420—is at least partially not between the rail segments. In the rail deployed configuration, the arm is rotated towards the user of the ladder such that the rail attachment upper portion and the rail attachment lower portion are perpendicular to the plurality of rung allowing the user of the ladder to maintain a secure grip. In the deployed configuration, the arm is positioned outward relative to the rail segments such that a user may hold on the arm.

Figure 17:
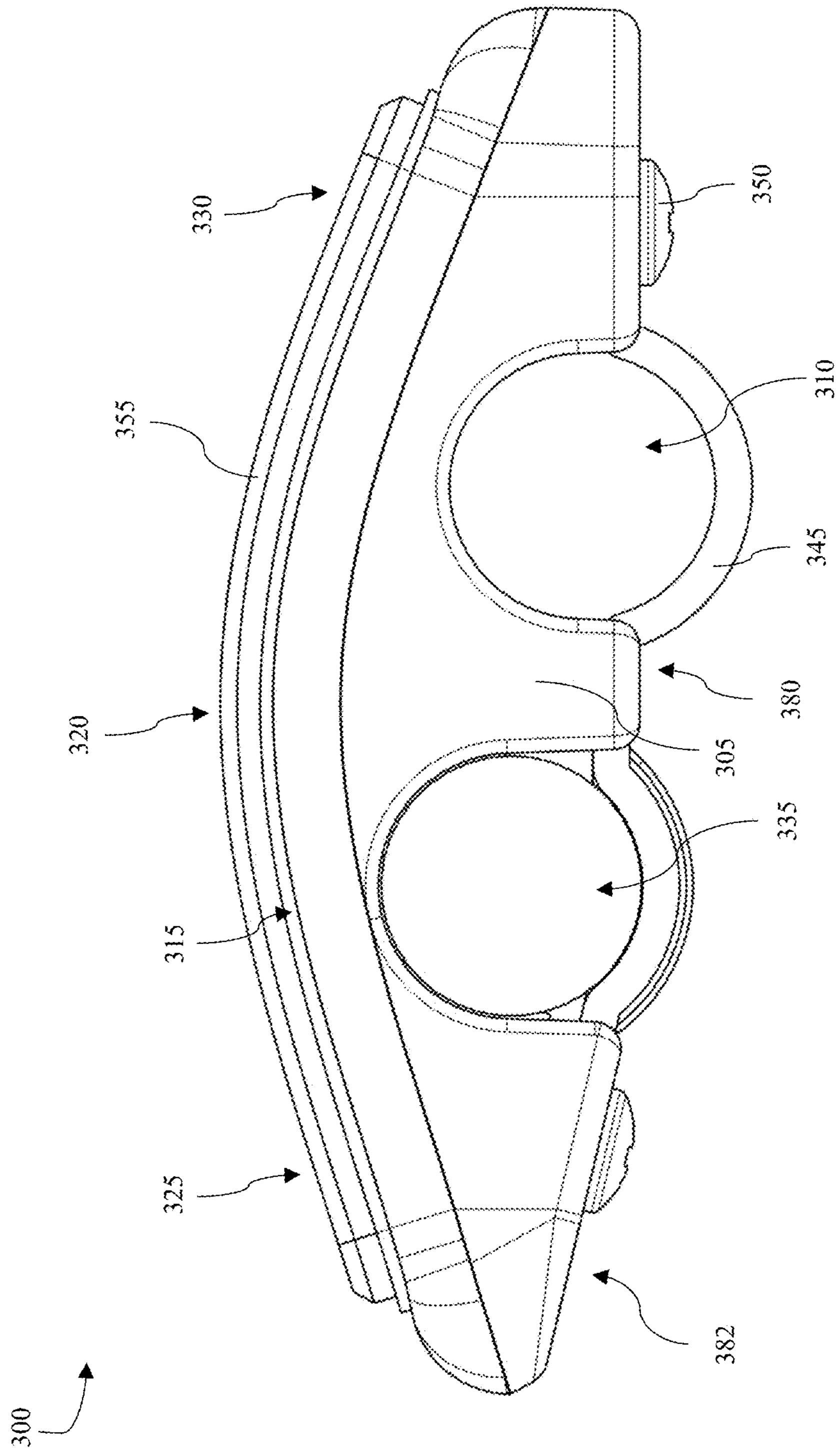
FIG. 17 is a side view of a rung attachment, according to an example embodiment.
Figure 18:
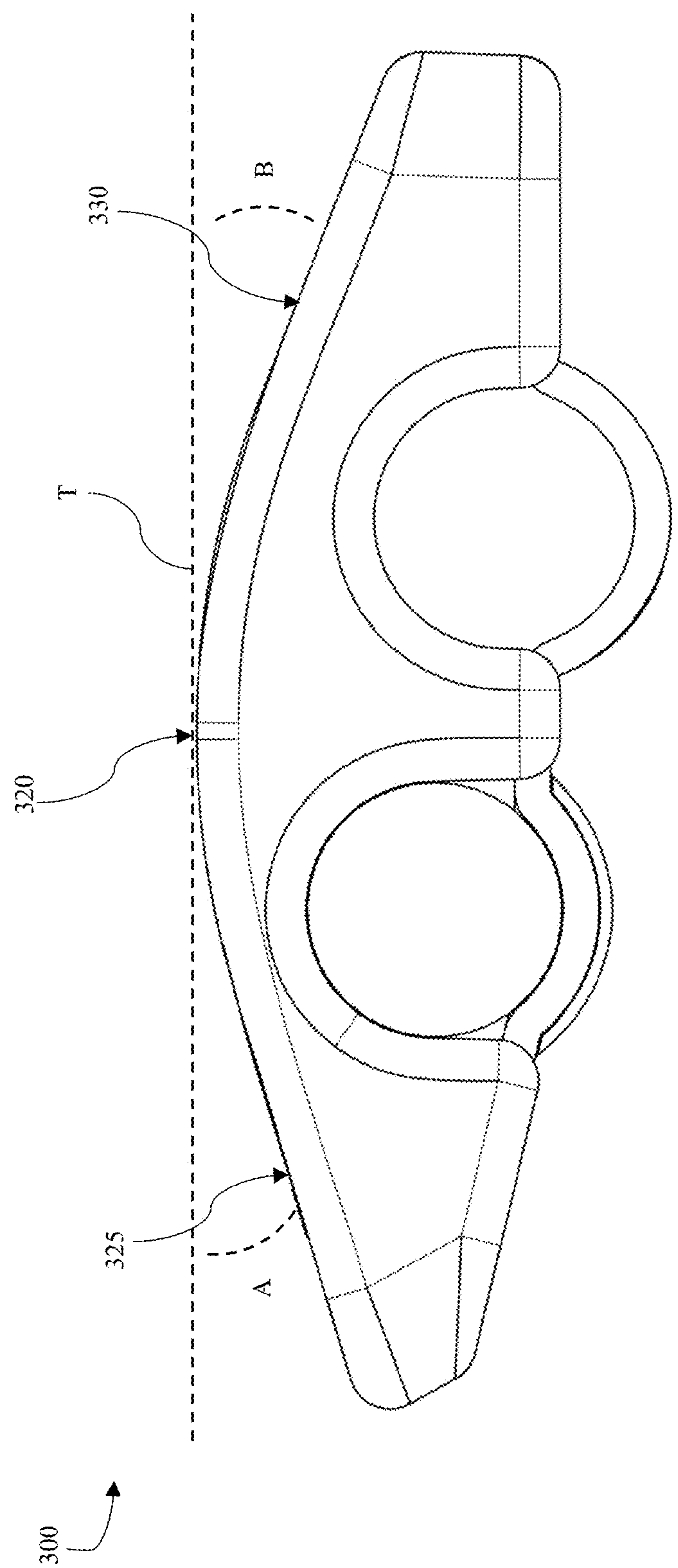
FIG. 18 is a side view of the rung attachment, according to an example embodiment.
Figure 19:
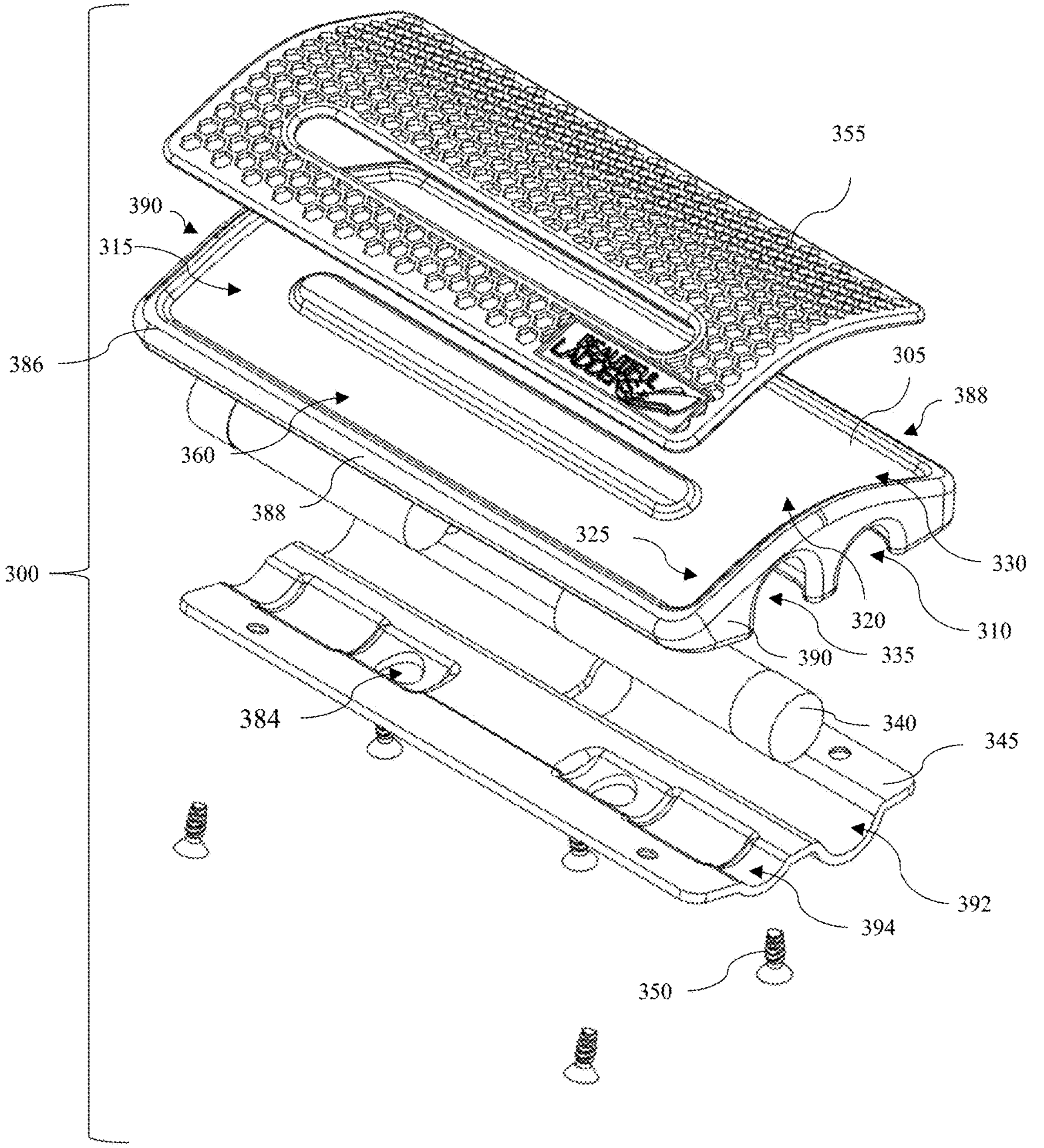
FIG. 19 is an exploded view of the rung attachment, according to an example embodiment.

Referring now to FIGS. 17, 18, and 19, views of the 300 rung attachment are shown, according to an example embodiment. FIG. 17 is a side view of the rung attachment, according to an example embodiment. FIG. 18 is a side view of the rung attachment illustrating the angles of the angle A and second angle B according to an example embodiment. FIG. 19 is an exploded view of the rung attachment, according to an example embodiment. The rung attachment, which is attached to each of the plurality of rungs, comprises a rung attachment body 305 spanning a substantial portion of the rung length 202, a recess 310 along a bottom section 380 of the rung attachment body for receiving the rung, and a top surface 315 of the rung attachment body. The bottom section of the rung attachment body is below the top surface 315 of the rung attachment body. The bottom section may include the plate when the plate is in attachment with the rung attachment body. The substantial portion of the rung length may be long enough to include both feet of a user.

The top surface includes a first section 320, second section 325, and a third section 330 of the top surface. The top surface of the rung attachment may define a curved or a convex curve meaning that it curves outwards from the rung attachment body. The outward curvature of the top surface, having the first section cojoined with the second section and the third section, corresponds to the arch of a person's foot such that that convexity of the top surface compliments the concavity of the arch of a person's foot. Each section of the top surface is configured to provide support to different parts of the sole of the user's foot when the user steps onto the top surface of the rung attachment. The curve of the first section may provide support to the arch, which is in the middle of the sole, of the user's foot. The second section may provide support to the tarsals and heel of the user's foot. The third section may provide support to the metatarsal and phalanges of the user's foot. The metatarsal of a person's foot is in between the arch of the sole and the toes. The first section includes an apex, peak, or highest point of the top surface of the rung attachment. The apex is the most outward point on the curve of the top surface. As shown in FIG. 14, all the first section 320 is above the rung when the rung attachment is attached to the rung 201 and the collapsible marine ladder is in the deployed configuration. It is understood that the peak or apex may be rounded. As shown in the embodiments in FIGS. 17 and 19, a mat 355 may be in attachment with the rung attachment body, which makes the top surface of the rung attachment to include the mat. In other embodiments similar to the one in FIG. 18, a mat may not be in attachment with the rung attachment body such that the top surface does not include a mat. The mat 355 may have properties such that ornamental features, branding and other designs may be used. The mat may be comprised of materials that provides a comfortable surface on which a user's foot to position his or her foot. The mat may also have flexible properties so that it may be manipulated into position. The materials for the mat may include rubber, polymeric materials such as foam, silicone, plastic, polyvinyl chloride (PVC) plastic, vinyl, silicone etc. or any combination thereof.

The second section 325 is cojoined or joined with a front side of the first section. Cojoined may mean that the second section is integral and extends from or below the apex or peak of the rung attachment body. The second section is downwardly angled such that an angle A (illustrated in FIGS. 18 and 22) of at least ten degrees and at most thirty degrees is formed between the first section and the second section. In other words, the second section of the top surface has an angle of at least ten degrees and at most thirty degrees relative to the first section or apex, peak of the top surface. The second section supports the heel of the user's foot when the user steps onto the ladder. In other embodiments, angle A may be six, seven, eight, or nine degrees.

The top surface further comprises a third section 330 cojoined with a back side of the first section, wherein the third section is downwardly angled such that a second angle B (illustrated in FIGS. 18 and 22) of at least ten degrees and at most thirty degrees is formed between the first section and the third section. In other words, the third section of the top surface has an angle of at least ten degrees and at most thirty degrees relative to the first section or apex, peak of the top surface. The third section supports the metatarsal of the user's foot when the user steps onto the ladder. In other embodiments, angle B may be six, seven, eight, or nine degrees.

The angle A and the second angle B are relative to a horizontal plane T that is tangent to the apex of the first section. The apex is the highest point on the curve of the first section when the bottom section of the rung attachment is parallel to the ground. The angle A and the second angle B are configured to provide comfort for a user by distributing the normal forces acting against the user's foot when stepping on the rung attachment. Instead of all the normal forces from a ladder's step acting against specific points on the sole of a person's foot, the curve of the top surface allows the rung attachment to support most points of the sole of the person's foot. A second recess 335 along the bottom section of the rung attachment body is for receiving a light emitting apparatus 340. The light emitting apparatus provides light providing visibility for the user when the marine vessel is in a dark environment. A plate 345 attaches by at least one a plate fastener 350 to the bottom section of the rung attachment body. The plate fastener may be comprised of carbon steel, aluminum, brass, or other metals or alloys. Other types of materials may also be used and are within the spirit and scope of the present invention. The plate fastener may include screws or bolts, but other types of fasteners may also be used and are within the spirit and scope of the present invention. The plate includes a plurality of openings 384 allowing a plurality of fasteners to keep the plate in attachment with rung attachment body.

With reference to FIG. 19, the rung attachment body 305 may include a third recess 360 that defines a lip 386. The lip created by the third recess surrounds the mat 355, which is configured to be flush in the third recess. The mat also includes an arc that similar to define the top surface. The rung attachment body may also include two walls 388 and two sidewalls 390 configured to define the rung attachment body by a rectangular shape. The walls are in attachment and perpendicular to the side walls. The side walls include the two openings made by the recess and second recess, which are extended by the plate. The plate includes a recess 394 corresponding to the recess of the rung attachment body and another recess 394 that corresponds to the second recess of the rung attachment body. The two recesses of the plate help the rung attachment hold onto the rung of the ladder and the light emitting apparatus.

Figure 20A:
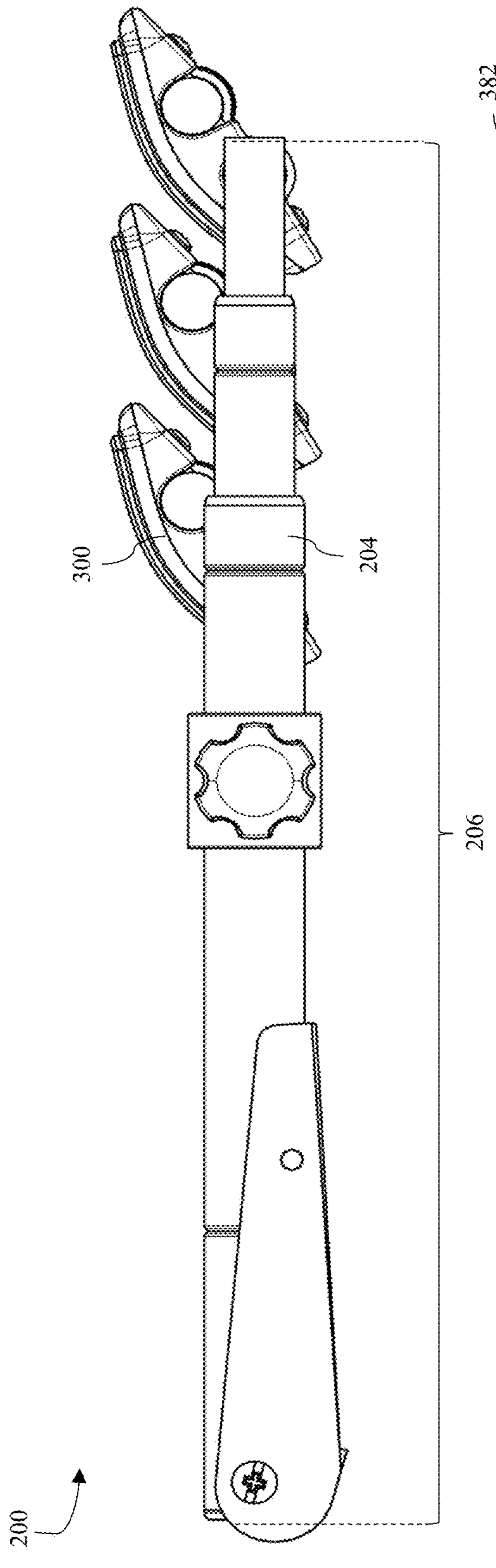
FIG. 20A is a side view of attachments for a collapsible marine ladder, wherein the ladder is in the stowed configuration, according to an example embodiment.
Figure 20B:
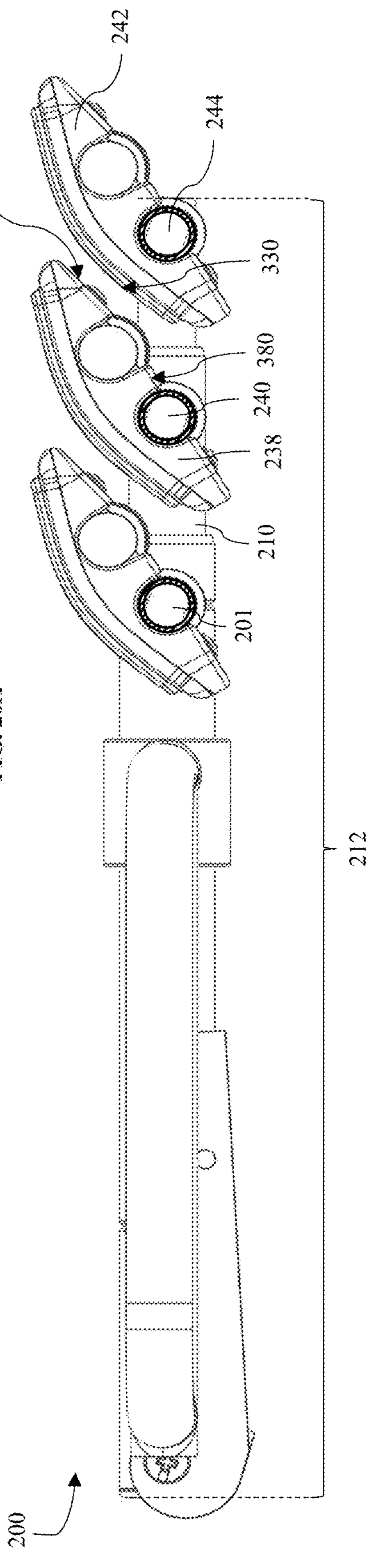
FIG. 20B is a side cross-sectional view of attachments for a collapsible ladder, wherein the ladder is in the stowed configuration, according to an example embodiment.
Figure 21:
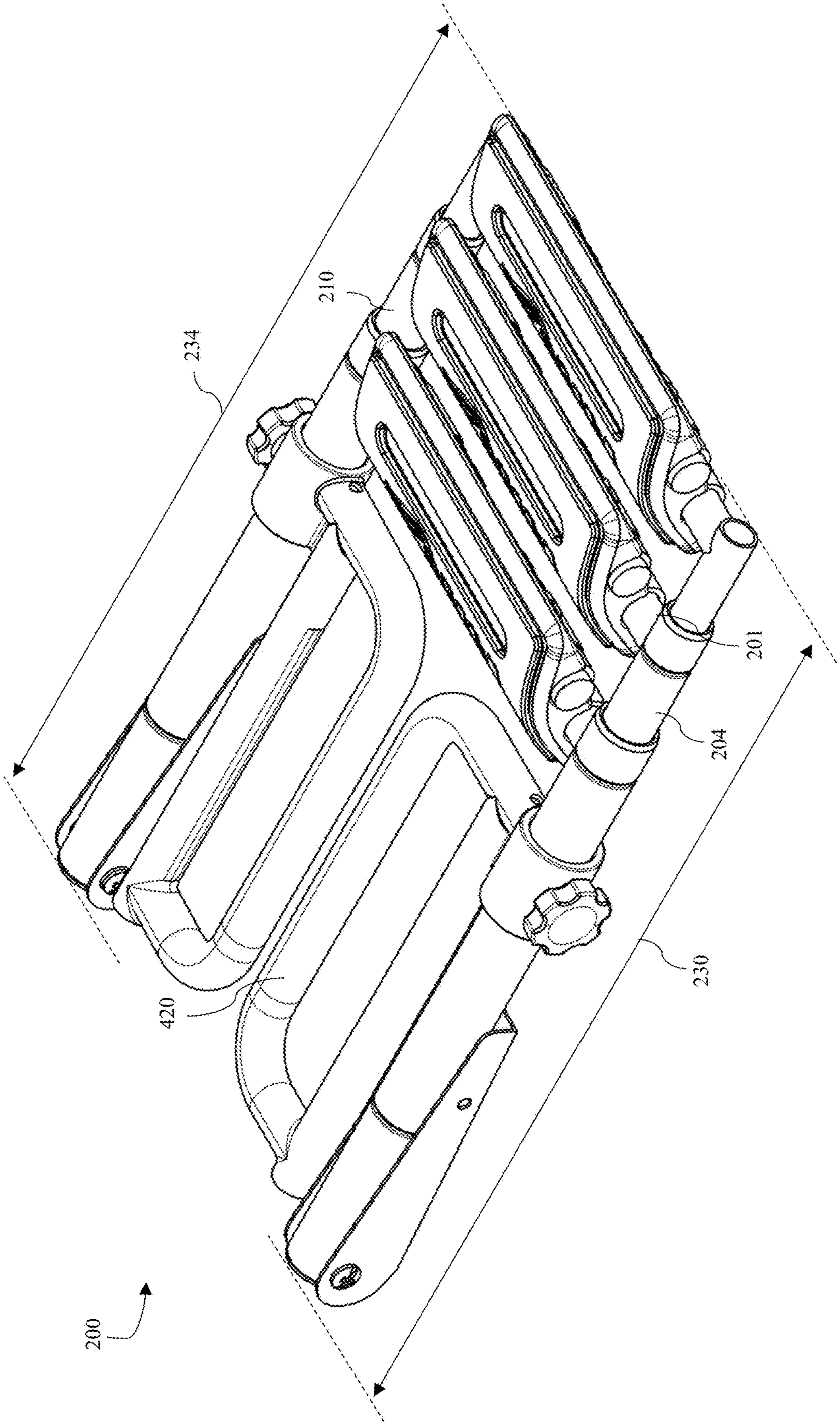
FIG. 21 is a perspective view of the attachments for a collapsible marine ladder, wherein the ladder is in the stowed configuration, according to an example embodiment.

Referring now to FIGS. 20A, 20B, and 21, views of attachments for a collapsible marine ladder, wherein the ladder is in the stowed configuration, are shown, according to an example embodiment. FIG. 20A is a side view of attachments for a collapsible marine ladder, wherein the ladder is in the stowed configuration, according to an example embodiment. FIG. 20B is a side cross-sectional view of attachments for a collapsible ladder, wherein the ladder is in the stowed configuration, according to an example embodiment. FIG. 21 is a perspective view of the attachments for a collapsible marine ladder, wherein the ladder is in the stowed configuration, according to an example embodiment. The stowed configuration allows the collapsible marine ladder to more compact such that the ladder may be stored. A first rail stowed rail length 230 of the first rail in the first rail stowed configuration is less than a first rail deployed rail length 232 of the first rail in the first rail deployed configuration. A second rail stowed rail length 234 of the second rail in the second rail stowed configuration is less than a second rail deployed rail length 236 of the second rail in the second rail deployed configuration. The rails of the ladder become shorter because the rail segments are further inserted into each other similar to closing a telescope. The rails of the ladder are shorter in length allowing the ladder to become more compact in the stowed configuration than in the deployed configuration. The stowed configuration further comprises a first rung attachment 238 mounted on a first rung 240 of the plurality of rungs and a second rung attachment 242 mounted on a second rung 244 of the plurality of rungs. When the ladder is positioned vertically, the first rung attachment and first rung are positioned below the second rung attachment and the second rung. The third section 330 of the first rung attachment is positioned at least proximal to a front section 382 of the bottom section 380 of the second rung attachment. The bottom section of the rung attachment includes the plate in attachment with the rung attachment body. The front section is proximate to the side of the ladder that the user would step on. When the ladder is in the stowed configuration, the rail segments are further inserted into each other causing the rung attachments to be relatively closer than they would be in the deployed configuration. Since the rung attachments are closer, the front section of the bottom sections of one rung attachment is near the third section of the top surface of a below rung attachment. The stowed configuration also includes a rail stowed configuration in which the arm 420 of the rail attachment is at least partially disposed between the first rail and the second rail. In the rail stowed configuration, the rail attachments are rotated towards each other allowing the ladder to become more compact when the collapsible marine ladder is ready for storage. The arms of the rail attachments may comprise a plurality of different materials.

Figure 22:
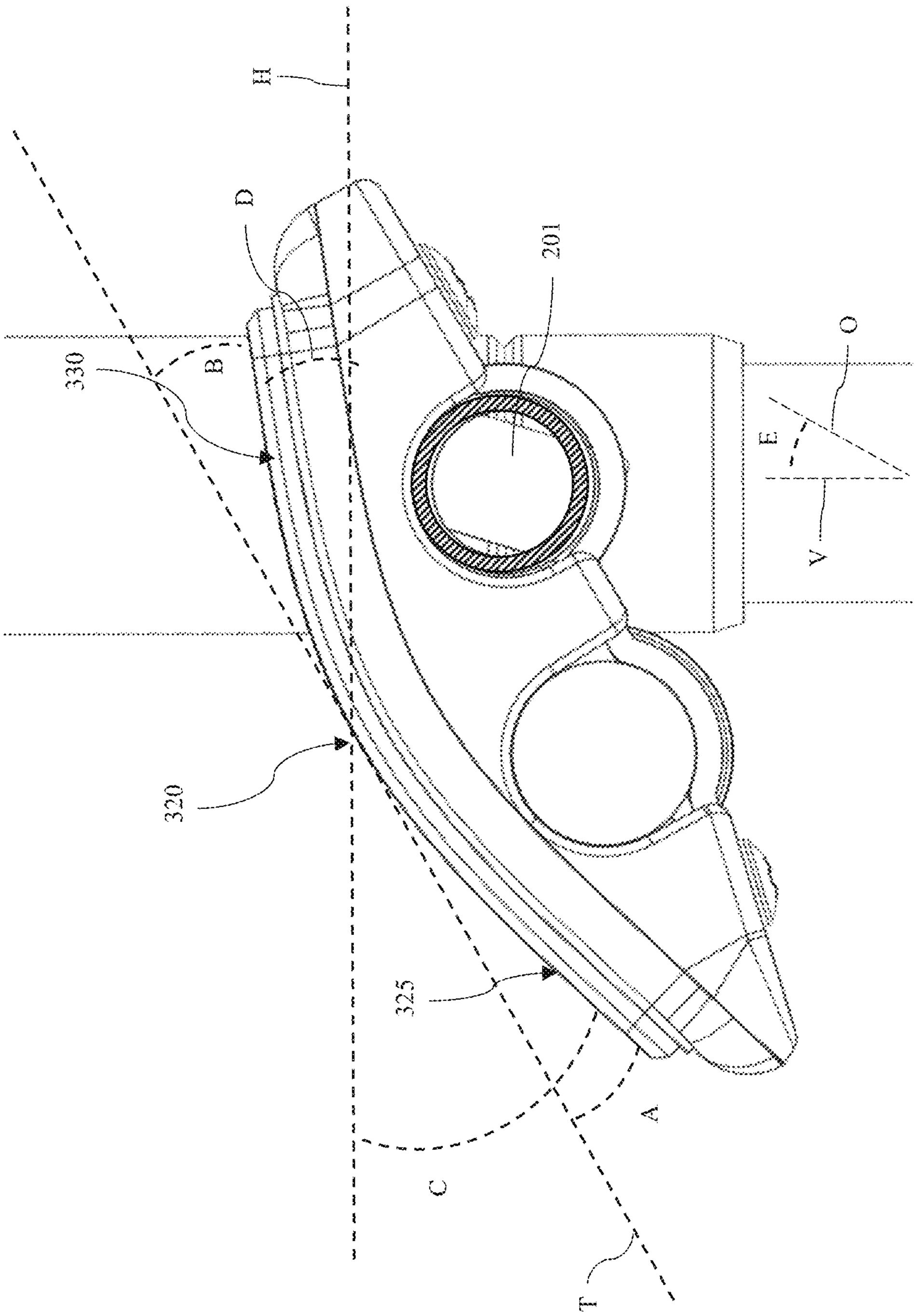
FIG. 22 is a cross-sectional view of the rung attachment for a collapsible marine ladder, wherein the ladder is in the deployed configuration, according to an example embodiment.

Referring now to FIG. 22, a cross-sectional view of the rung attachment for a collapsible marine ladder, wherein the ladder is in the deployed configuration, is shown, according to an example embodiment. FIG. 22 is a cross-sectional view of the rung attachment for a collapsible marine ladder, wherein the first rail and the second rail are vertical when the ladder is in attachment with the marine vessel, according to an example embodiment. In FIG. 22 the ladder is in the fully deployed configuration. In certain embodiments, as shown in FIG. 22, the ladder rails are parallel to line O when angle E is zero degrees from the vertical plane, which is parallel to gravity or perpendicular to the water surface. The vertical plane is represented by line V. However, it is understood that in other embodiments, the ladder will not be substantially vertical but will be vertically arranged parallel to line O when the angle E, which may be up to 15.5 degrees, is greater than 0 degrees from the line V. The rails of the ladder will always be parallel to the plane represented by line O.

The collapsible marine ladder 200 has a plurality of rungs and comprises a stowed configuration and a deployed configuration, wherein the rung attachment comprises a rung attachment body 305 spanning a substantial portion of a rung length 202 of a first rung of the plurality of rungs. A recess 310 along a bottom section of the rung attachment body receives the first rung. A top surface 315 of the rung attachment body comprises a first section 320, a second section 325, and a third section 330. Although the apex may not be exactly depicted in FIG. 22, the apex is the outward most point of the curve in the first section. The horizontal plane represented by line H intersects the plane represented by line T, where line T is a line tangent to the apex of the first section. All of the first section is above the rung 201 when the rung attachment is attached to the rung and the collapsible marine ladder is in the deployed configuration. The horizontal plane H intersects the apex of the first section and remains horizontally aligned with the ground surface. In certain embodiments, the horizontal plane H and tangent plane T may be parallel. In other embodiments, where the step is angled above the rung, the line H intersects the apex of the first section thereby forming angle C and angle D with the second section and third section respectively. In other words, the apex of the rung attachment is above the rung when the when the rung attachment is attached to the rung and the collapsible marine ladder is in the deployed configuration having a constant horizontal plane through the apex, as shown in FIG. 22.

The second section 325 of the top surface is cojoined with a front side of the first section 320 of the top surface. The second section of the top surface is downwardly angled such that an angle A of at least ten degrees and at most thirty degrees is formed between the first section of the top surface and the second section of the top surface wherein all of the first section of the top surface is above the rung when the rung attachment body of the rung attachment is attached to the rung and the collapsible marine ladder is in a deployed configuration. The angle A is relative to a plane (represented by Line T) that is tangent to the apex of the first section which is above the rung. Ideally, the stringer of the ladder is vertical such that angle E, as measured with respect to a vertical axis (line V), is zero degrees. The angle C is the angle between the second section and the horizontal plane. When angle E is zero degrees, the angle C is from twenty up to fifty degrees below the horizontal plane (line H). However, in other embodiments, the stringer of the ladder may be at an angle E greater than zero, for example 15.5 degrees. As such, the range of angle C shall be offset by the angle E of the stringer of the ladder. For example, if the stringer of the ladder is at angle E of 15.5 degrees, then the angle C is between 4.5 up to 34.5 degrees below the horizontal plane (line H). Other degrees for angle E are within the spirit and scope of the disclosure such that the first section of the step is above the rung and where the second section and third section are downwardly angled with respect to said first section.

Similarly, the third section 330 is cojoined with a back side of the first section of the top surface. The third section is angled relative to the apex such that a second angle B is between at least ten degrees and at most thirty degrees is formed between the first section and the third section relative to the plane represented by Line T. The angle D is the angle between the horizontal plane and the third section. When angle E is zero degrees, the angle D is up to 35 degrees above the horizontal plane (line H). However, in other embodiments, the stringer of the ladder may be at an angle E greater than zero, for example 15.5 degrees. As such, the range of angle D shall be offset by the angle E of the stringer of the ladder. For example, if the stringer of the ladder is at angle E of 15.5 degrees, then the angle D shall be between −15.5 degrees below the horizontal plane (line H) and up to 19.5 degrees above the horizontal plane (line H). Other degrees for angle E are within the spirit and scope of the disclosure such that the first section of the step is above the rung and where the second section and third section are downwardly angled with respect to said first section. For example, the system may be offset by angle E depending on how it is mounted, in particular, to the stern of a boat for example. The ladder may be mounted to other parts of a boat that may affect the lie angle E of the system, as measured from a vertical axis (line V).

Moreover, angle C is dependent on angle A because angle C is measured from the horizontal plane (line H) up to the second section. Likewise, angle D is dependent on angle B because angle D is measured from the horizontal plane (line H) up to the third section. It is noted that the first section being conjoined with each of the second section and the third section may be continuously curved such that angle C and angle D, as measured from the horizontal plane (line H) to any point on each of the second section and the third section, respectively, is between the disclosed ranges.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A collapsible marine ladder comprising a stowed configuration and a deployed configuration, wherein the collapsible marine ladder comprises:

- a first rail and a second rail;
- a plurality of rungs, wherein each rung of the plurality of rungs has a rung length spanning between the first rail and the second rail;
- a plurality of first rail segments telescopically arranged defining the first rail so that the first rail can move between a first rail stowed configuration and a first rail deployed configuration;
- a plurality of second rail segments telescopically arranged defining the second rail so that the second rail can move between a second rail stowed configuration and a second rail deployed configuration;
- a rung attachment attached to each rung of the plurality of rungs, wherein the rung attachment comprises:
  - a rung attachment body spanning a substantial portion of the rung length of each rung;
  - a top surface of the rung attachment body;
  - a first section of the top surface defining an apex of the top surface, wherein all the first section is above the rung when the rung attachment is attached to the rung and the collapsible marine ladder is in the deployed configuration; and
  - a second section contiguous with a front side of the first section, wherein the second section is downwardly angled relative to the apex of the first section such that an angle of at least ten degrees and at most thirty degrees is formed between the first section and the second section;
  - a third section contiguous with a back side of the first section, wherein a third section is downwardly angled relative to the apex of the first section such that a second angle of at least ten degrees and at most thirty degrees is formed between the first section and the third section;
  - a first recess along a bottom section of the rung attachment body coupled to the rung of the plurality of rungs, wherein the first recess is disposed below the third section of the rung attachment;
  - a second recess along the bottom section of the rung that is disposed below the second section of the top surface and is adjacent to the first recess; and
  - a light element disposed within the second recess;
- wherein, in the deployed configuration, the third section of the top surface is disposed above the rung that is disposed the first recess such that the third section has an effective upward incline relative to a horizontal plane extending through the first section; and
- wherein, in the deployed configuration, the second section of the top surface is oriented at an effective angle of between 20 degrees and 50 degrees downward relative to the horizontal plane extending through the first section.

2. The collapsible marine ladder of claim 1, wherein a plate attaches by at least one a plate fastener to the bottom section of the rung attachment body.

3. The collapsible marine ladder of claim 1, further comprises:

- a first rail stowed rail length of the first rail in the first rail stowed configuration that is less than a first rail deployed rail length of the first rail in the first rail deployed configuration; and
- a second rail stowed rail length of the second rail in the second rail stowed configuration that is less than a second rail deployed rail length of the second rail in the second rail deployed configuration.

4. The collapsible marine ladder of claim 1, wherein in the stowed configuration the collapsible marine ladder further comprises:

- a first rung attachment mounted on a first rung of the plurality of rungs;
- a second rung attachment mounted on a second rung of the plurality of rungs; and
- wherein the third section of the first rung attachment is positioned at least proximal to a front section of the bottom section of the second rung attachment.

5. The collapsible marine ladder of claim 1, wherein a rail attachment is adjustably attached to a rail upper end portion of at least one of the first rail and the second rail, wherein the rail attachment comprises:

- a rail attachment upper portion and a rail attachment lower portion;

a rail receiving element at the rail attachment lower portion, wherein the rail receiving element is configured for adjustably attaching the rail receiving element to the rail upper end portion of at least one of the first rail and the second rail; and an arm in attachment with and extending upward relative to the rail receiving element.

6. The collapsible marine ladder of claim 5, wherein the rail attachment further comprises:

at least one wall defined by the rail receiving element for contacting the rail upper end portion;

a second arm extending radially outward from the rail receiving element and connecting the arm to the rail attachment; and a securing means for removably securing the at least one wall of the rail receiving element to the rail upper end portion.

7. The collapsible marine ladder of claim 6, wherein the rail attachment further comprises:

a rail stowed configuration in which the arm of the rail attachment is at least partially disposed between the first rail and the second rail; and a rail deployed configuration in which the arm of the rail attachment is not at least partially between the first rail and the second rail.

8. The collapsible marine ladder of claim 1, the collapsible marine ladder further comprises:

a bracket hingedly in attachment with the rail upper end portion of the first rail;

a base of the bracket is configured to be in attachment with a marine vessel;

a first bracket body extending upward from the base;

a second bracket body opposing and spaced apart from the first bracket body extending upward from the base;

a first bracket fastener for movably connecting the rail upper end portion to the first bracket body; and a second bracket fastener for movably connecting the rail upper end portion to the first bracket body.

9. The collapsible marine ladder of claim 1, wherein the first recess and the second recess are vertically offset relative to one another with respect to a horizontal reference plane that is tangent to the apex of the first section.

10. The collapsible marine ladder of claim 9, wherein a centerpoint of the first recess is disposed at a first vertical distance from the horizontal reference plane and a second centerpoint of the second recess is disposed at a second vertical distance from the horizontal reference plane, wherein the first vertical distance is greater than the second vertical distance.

11. The collapsible marine ladder of claim 9, wherein, in the deployed configuration and the stowed configuration, the second recess having the light is vertically offset below the first recess that is in attachment with the rung.

12. A rung attachment for a collapsible marine ladder, wherein the collapsible marine ladder has a plurality of rungs and comprises a stowed configuration and a deployed configuration, wherein the rung attachment comprises:

a rung attachment body spanning a substantial portion of a rung length of a first rung of the plurality of rungs;

a first section of the top surface defining an apex of the top surface, wherein all the first section is above the first rung when the rung attachment is attached to the first rung and the collapsible marine ladder is in the deployed configuration; and a second section contiguous with a front side of the first section, wherein the second section is downwardly angled relative to the apex of the first section such that an angle of at least seven degrees and at most thirty degrees is formed between the first section and the second section;

a third section contiguous with a back side of the first section, wherein a third section is downwardly angled relative to the apex of the first section such that a second angle of at least ten degrees and at most thirty degrees is formed between the first section and the third section;

a first recess along a bottom section of the rung attachment body coupled to the rung of the plurality of rungs, wherein the first recess is disposed below the third section of the rung attachment;

a second recess along the bottom section of the rung that is disposed below the second section of the top surface and is adjacent to the first recess; and a light element disposed within the second recess;

wherein, in the deployed configuration, the third section of the top surface is disposed above the rung that is disposed the first recess such that the third section has an effective upward incline relative to a horizontal plane extending through the first section; and wherein, in the deployed configuration, the second section of the top surface is oriented at an effective angle of between 20 degrees and 50 degrees downward relative to the horizontal plane extending through the first section.

13. The rung attachment of claim 12, wherein a plate attaches by at least one plate fastener to the bottom section of the first rung attachment.

14. A collapsible marine ladder comprising a stowed configuration and a deployed configuration, wherein the collapsible marine ladder comprises:

a first rail and a second rail;

a plurality of rungs, wherein each rung of the plurality of rungs has a rung length spanning between the first rail and the second rail;

a rung attachment attached to each of the plurality of rungs, wherein the rung attachment comprises:

a rung attachment body spanning a substantial portion of the rung length;

a top surface of the rung attachment body;

a first section of the top surface defining an apex of the top surface, wherein all the first section is above the first rung when the rung attachment is attached to the first rung and the collapsible marine ladder is in the deployed configuration; and a second section contiguous with a front side of the first section, wherein the second section is downwardly angled relative to the apex of the first section such that an angle of at least seven degrees and at most thirty degrees is formed between the first section and the second section;

a third section contiguous with a back side of the first section, wherein a third section is downwardly angled relative to the apex of the first section such that a second angle of at least ten degrees and at most thirty degrees is formed between the first section and the third section;

a first recess along a bottom section of the rung attachment body coupled to the rung of the plurality of rungs, wherein the first recess is disposed below the third section of the rung attachment;

a second recess along the bottom section of the rung that is disposed below the second section of the top surface and is adjacent to the first recess; and a light element disposed within the second recess;

wherein, in the deployed configuration, the third section of the top surface is disposed above the rung that is disposed the first recess such that the third section has an effective upward incline relative to a horizontal plane extending through the first section; and wherein, in the deployed configuration, the second section of the top surface is oriented at an effective angle of between 20 degrees and 50 degrees downward relative to the horizontal plane extending through the first section.

15. The collapsible marine ladder of claim 14, wherein a plate attaches by at least one a plate fastener to the bottom section of the rung attachment body.

* * * * *